(12) United States Patent
Park et al.

(10) Patent No.: US 6,170,786 B1
(45) Date of Patent: Jan. 9, 2001

(54) TRANSPORT ACCOMMODATION

(75) Inventors: James William Park; Philip Haith, both of London (GB)

(73) Assignee: Singapore Airlines, Ltd.(SG)

( * ) Notice: Under 35 U.S.C. 154(b), the term of this patent shall be extended for 0 days.

(21) Appl. No.: 09/026,386

(22) Filed: Feb. 19, 1998

(51) Int. Cl.$^7$ .................................................. E04G 3/00
(52) U.S. Cl. .................. 248/274.1; 248/919; 297/188.16
(58) Field of Search ............................ 244/118.6, 122 R; 297/232, 248, 354.1, 217.3, 411.32, 423.26, 423.28, 423.23, 188.17, 188.16; 248/274.1, 276.1, 282.1, 284.1, 291.1, 289.11, 278.1, 280.11, 919, 921, 922, 923, 917; 348/837

(56) References Cited

U.S. PATENT DOCUMENTS

| | | |
|---|---|---|
| 2,174,622 | 10/1939 | Dale . |
| 2,526,623 | 10/1950 | Maurer . |
| 4,588,226 | 5/1986 | Young et al. . |
| 4,625,934 | 12/1986 | Ryan et al. . |
| 4,671,572 | 6/1987 | Young et al. . |
| 4,674,713 | 6/1987 | Ryan et al. . |
| 5,076,524 * | 12/1991 | Reh et al. ..................... 248/278.1 X |
| 5,082,328 | 1/1992 | Garelick . |
| 5,177,616 * | 1/1993 | Riday .............................. 248/917 X |
| 5,179,447 | 1/1993 | Lain ................................ 248/917 X |
| 5,193,765 | 3/1993 | Simpson et al. . |
| 5,195,709 * | 3/1993 | Yasushi ........................... 248/280.11 |
| 5,333,818 | 8/1994 | Brandt et al. . |
| 5,547,248 * | 8/1996 | Marechal ...................... 248/278.1 X |
| 5,556,017 * | 9/1996 | Troy ............................ 297/188.15 X |
| 5,667,179 * | 9/1997 | Rosen .............................. 248/917 X |
| 5,850,997 * | 12/1998 | Rosen ............................ 248/278.1 X |
| 5,853,220 * | 12/1998 | Gulich et al. ................... 297/188.16 |
| 5,946,055 * | 8/1999 | Rosen .................................. 348/837 |

FOREIGN PATENT DOCUMENTS

| | | |
|---|---|---|
| 3719105A1 | 12/1988 | (DE) . |
| 4039100A1 | 6/1992 | (DE) . |
| 9421813U1 | 11/1996 | (DE) . |
| 0 639 479 A1 | 2/1995 | (EP) . |
| 1056648 | 1/1967 | (GB) . |
| 1508792 | 9/1974 | (GB) . |
| 2037579 | 12/1979 | (GB) . |
| 2295962 | 6/1996 | (GB) . |
| 5-13838 | 2/1997 | (JP) . |
| 96/18537 | 6/1996 | (WO) . |

* cited by examiner

*Primary Examiner*—Ramon O. Ramirez
(74) *Attorney, Agent, or Firm*—Howrey Simon Arnold & White, LLP

(57) ABSTRACT

A seat for, for example, an aircraft that has an open outer shell which embraces a seat portion, a seat back, a head rest and a foot rest when the seat is in an upright position. Also embraced by the shell are a pair of arm rests. The seat is reclinable into a bed configuration such that the seat portion is moved forwardly out of the open end of the shell. Simultaneously, the arm rests are movable between the raised position and the position substantially flush with the seat portion. In the bed configuration, the removal of the arm rests from the raised position significantly increases the width of the bed, thus enhancing the comfort of the user.

6 Claims, 41 Drawing Sheets

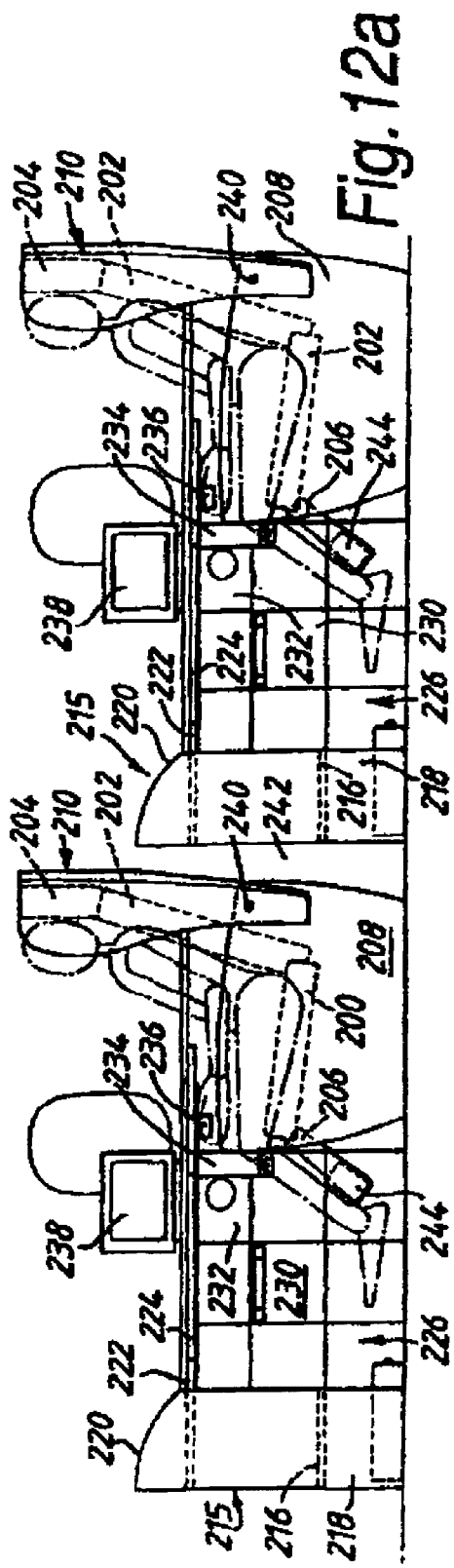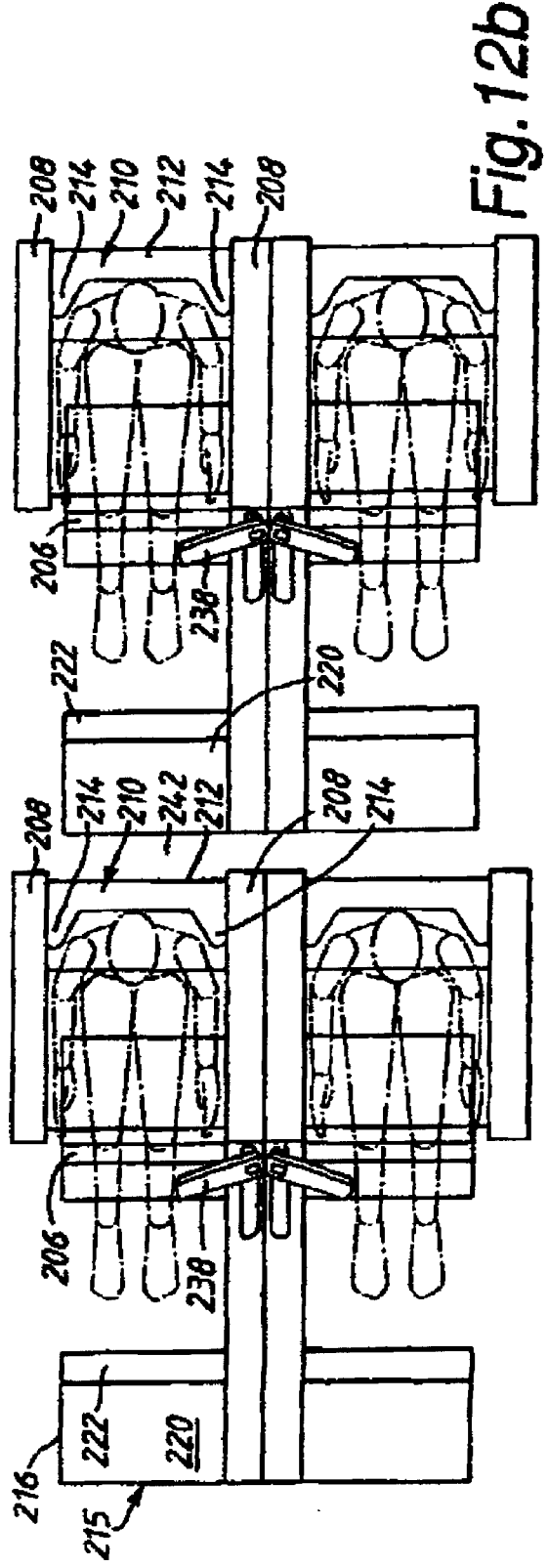

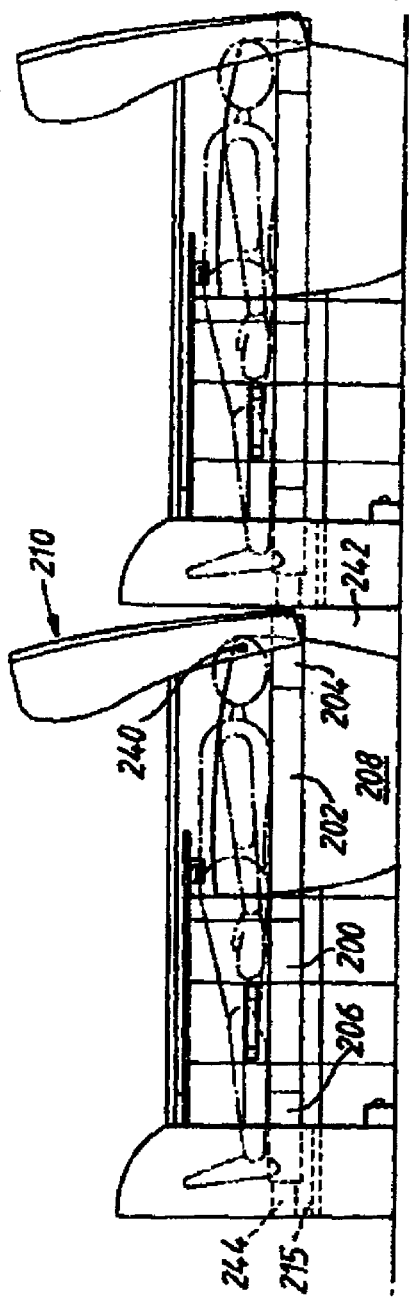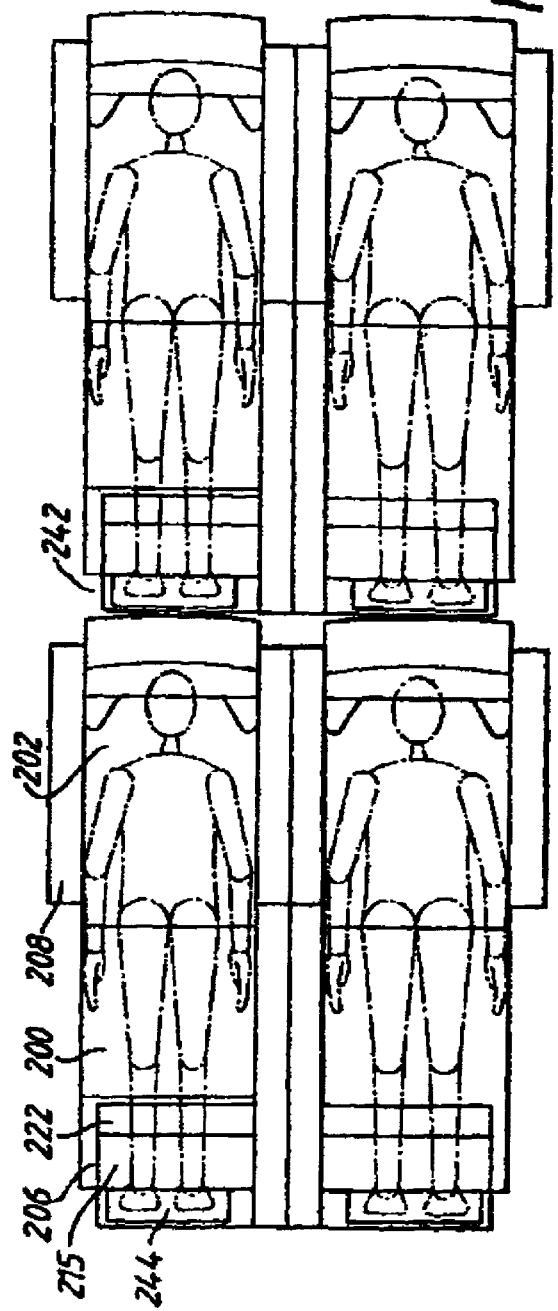

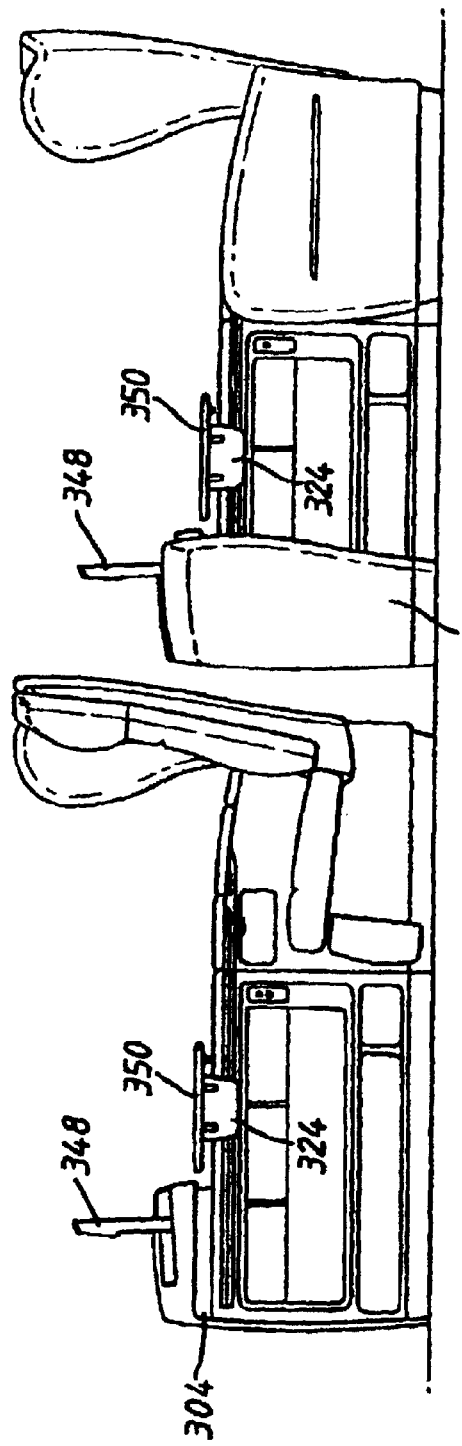
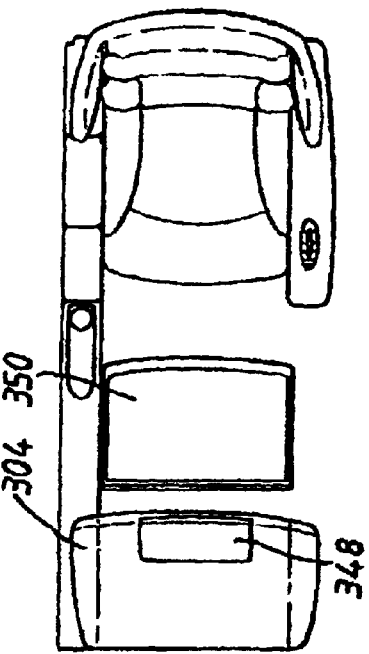
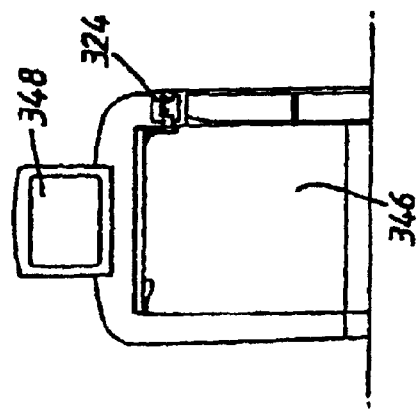
Fig. 15d
Fig. 15e
Fig. 15c

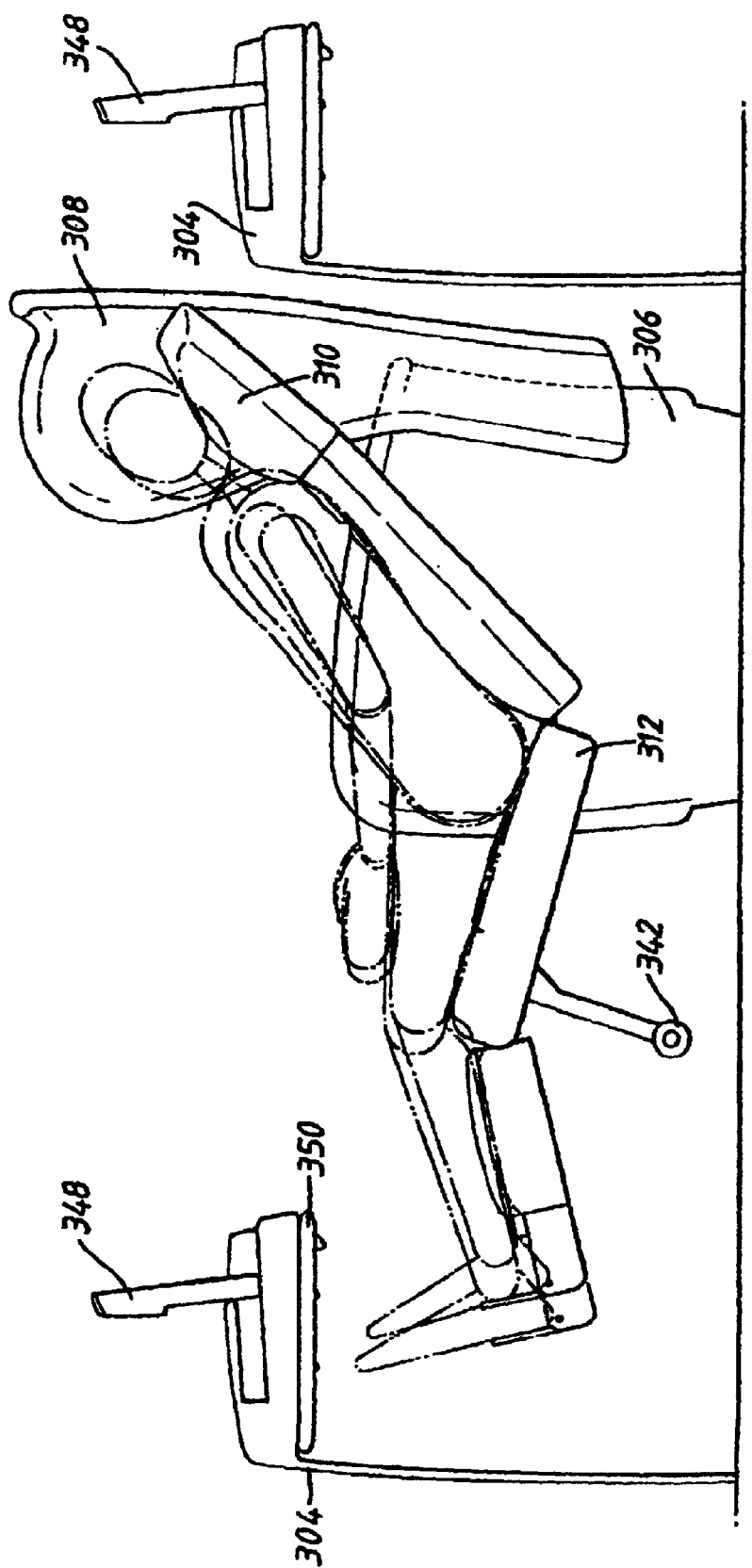

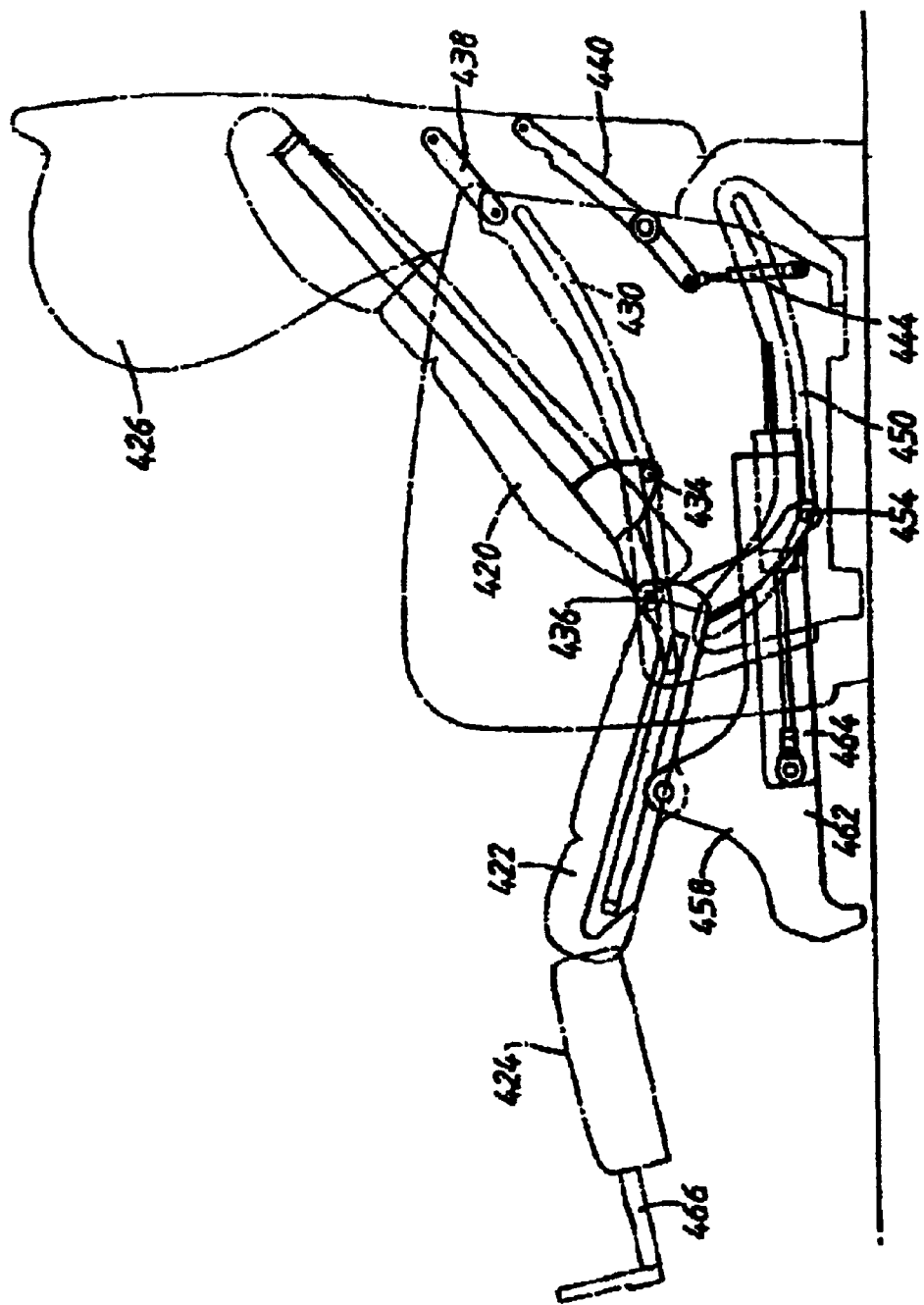

TRANSPORT ACCOMMODATION

FIELD OF THE INVENTION

This invention relates to improvements in vehicle seats. The invention is particularly applicable to aircraft seats.

BACKGROUND OF THE INVENTION

In keeping with reclinable seat arrangements in general, a typical aircraft passenger seat comprises a seat part, a seat back, a leg rest and a pair of arm rests. The seat back is movable between an upright position and a reclined position in which the back is at an attitude that is closer to the horizontal. The leg rest is likewise movable between a lowered position in which it is tucked out of the way against the front of the seat, and a raised position in which the leg rest forms an effective extension of the seat portion.

The more elaborate types of aircraft seats are configurable as an approximation of a bed. These are of particular benefit on long haul flights. Such an arrangement is usually found in first class accommodation where the space afforded each passenger's seat is at its greatest. However, even though a greater amount of space is provided for each seat in first class accommodation, there are still severe restrictions on space and weight that must be considered when designing the seat itself and the arrangement of the seats in the cabin.

When the seat back is reclined and the leg rest is raised, the seat occupant is able to rest in a recumbent posture more comfortable for sleeping. Although the first class seat is wide in comparison to economy and business class seats, it is still restricted as a bed. A considerable amount of the width is taken up in the side arms which are made as part of the structure within which the seat components are mounted. In conventional thinking, the fact that arm rests are necessary is put to advantage by using them as stowage space for a foldable table, and seat and entertainment controls, etc. However, if anything, their additional uses have tended to increase the width of the arms. This requires that the seat portion be narrower or the seat as a whole be wider.

It is an object of the invention to provide a more comfortable sleeping arrangement than the prior art reclined seat allows.

SUMMARY OF THE INVENTION

According to the first aspect of the invention, there is provided a seat for an aircraft, comprising a seat portion, at least one side arm and a side member adjacent the or each arm, the at least one side arm being movable between a deployed position, in which an upper surface of the side arm is arranged as an arm rest in relation to the seat, and a retracted position, in which the side arm is moved from the deployed position to create a greater width of seat.

Also according to the invention, there is provided a seat for an aircraft cabin composing a seat portion, a back portion and at least one side arm, the back portion being movable between upright and reclined positions, and the seat portion being movable forwardly to accommodate the back portion in the reclined position, wherein the at least one side arm is movable forwardly with the seat portion.

Another aspect of a reclinable aircraft passenger seat is the movement of the seat back into the "space" of the passenger behind. A seat, defined from somewhere behind the back of the seat in front to the seat back, is a form of territory. The passenger is likely to feel that space invaded by reclining the seat back of the seat in front into it. Even in the relatively less dense seating in first class accommodation, this can be irritating. Passengers paying premium rates for first class travel are least inclined to put up with this type of encroachment into their territory.

To address this, it has been proposed to define the territory the passenger occupies by means of a fixed shell in which the seat is adjustable. Within the confines of the shell, the passenger is able to adjust the seat such that the passenger behind is unaware of any adjustment. The seat has a fixed space defined by the shell that is not modified by the actions of the occupant at any time. However, the seat inside a fixed shell is likely to be elaborate, complicated and costly in correction. It is also likely to be significantly heavier because of the extra padding required. The fixed shell is also a compromise on the versatility of the seat adjustment if the shell is not to be excessively large in the first place.

It is also an object of the invention to accommodate versatile adjustment of the seat without compromising the space available to other passengers.

According to another aspect of the invention, there is provided an aircraft in which the inboard line of seats includes rows of pluralities of seats arranged in a mutually converging relationship.

Furthermore, the provision of ancillary equipment such as a television monitor, a table surface, stowage space, etc. have been provided according to largely the same formula up to now. For example, the television monitor or table surface is stored in the seat. This is often inconvenient to use, requiring a sequence of maneuvers to bring the item into usable position. It can also add to the bulk of the side of the seat when space requirements may place an emphasis on making the seat as narrow as possible.

The invention also provides a passenger seat for an aircraft composing a seat and a console in front of the seat the console containing ancillary equipment for use by the seat occupant.

Another object of the invention is to provide ancillary equipment in a space-efficient and convenient arrangement in a seat for an aircraft.

Thus, also according to the invention there is provided a stowable table for a vehicle accommodation unit, comprising a bulkhead panel for supporting the table, a table top pivotably mounted to the bulkhead to be pivotable between an deployed position and a stored position about a pivot point which is recessed in relation to the bulk head, and a groove defined in the bulk head, the top being receivable, in the deployed position, along the groove such that the top is maintained in the deployed position when received in the groove.

The invention also provides a seat for an aircraft comprising a seat, a console for ancillary equipment in front of the seat, a side unit extending from one side of the seat to the console and having a guide therein, a table surface mounted to run along the guide between a stowed position in the console and a deployed position outside the console.

According to the invention, there is further provided a display screen console for a vehicle accommodation unit comprising a display screen, a display screen storage space and a storage space cover in which the storage space cover is movable to an open position to allow the display screen to be moved between a display position and stowed position and the storage space cover is further movable to a closed position to cover the stowage space when the display screen is in either position.

Another problem associated with the reclined aircraft passenger seat configured as a bed is that it has marked undulations defined by the different attitudes at which the back, seat portion and leg rest lie. A normal bed is flat. This allows the various contours of the human form to be accommodated by the cushioning effect that a mattress has. It is far less the case with a reclinable aircraft seat unless the design of the seat is of sufficient complexity to allow the seat components to lie flat. The added complexity may have attendant space and weight disadvantages.

If the undulating form of the reclined seat can be considered to have peaks and troughs, the rise to the peak at which the end of the seat meets the leg rest generally coincides with the hip bone of the recumbent occupant. This is an unyielding extremity that should be absorbed by a cushioning part of the seat, but is not. Similarly, the waist region above the hip is often a recess in the human form. This is met by a trough at the junction of the seat back and the seat portion which can be painful on the spine if the occupant sleeps on one side for an extended period.

As a further complication, the seat must be able to adopt configurations intermediate to the fully upright and bed positions. In so doing, the seat components should be arrangeable in a form that is sympathetic with the body in a recumbent, but not supine, posture.

Thus, it is an object of the invention to provide a seat that can adopt a bed configuration and is able to support the recumbent human form more comfortably.

According to the invention, there is also provided a seat for an aircraft comprising a seat portion and a back portion, the back portion being movable between a substantially upright and a reclined position in relation to the seat portion, the seat portion being movable forwardly to accommodate the back portion in the reclined position, the seat fuller comprising a first member arranged toward the front of the seat portion, which member is adjustable as a support to compensate for undulations in the seat when the back portion is in the reclined position.

The facilities associated with an aircraft seat often include a table that can be folded away when it is not needed. Conventionally, a foldable table is stowed in the area of the seat. However, it has now been recognized that the table can be stowed not as part of the seat itself to allow greater flexibility in seat design.

Thus, it is also an object of the invention to provide a stowable table for a vehicle accommodation unit that is arranged to have less impact on the design of the seat.

While the seating in a first class cabin of an aircraft is considerably less dense than it is in business or economy class, the arrangement of the seats in rows is not conducive to affording the seat occupants much privacy. It is possible to install small screens between seats that can be raised and lowered by one of the occupants at will. However, the act of raising the screen can be viewed as an anti-social act in itself which may make some people reticent about using it at all. It is preferable to arrange the seats to afford the same requisite level of privacy, such that erection of further privacy aids by the seat occupant is likely to be needed.

It is a further object of the invention to provide a seat arrangement that affords a sense of a greater degree of privacy than is commonly used seating arrangements in vehicle accommodations.

Further problems with known consoles arise when maintenance, repair, installation or removal of a seating unit is required. In order to keep aircraft ground time as low as possible, it is desirable to be able to carry out those steps as quickly as possible. To facilitate rapid access to the fastenings holding each seating unit in place, in particular those provided behind the unit, it is preferable to provide a gap of 3" (7.5 cm) between the back of one console and the front console of the unit behind. This allows the bolts or other fastenings to be easily reached and provides room for manipulation of the work tools. In known systems incorporating a fixed shell behind the back portion of the seat, this gives rise to problems, in particular over a number of seating units, in that, the amount of cabin space available is reduced.

It is an object of the invention to provide an aircraft seat capable of being accessed for removal or maintenance quickly and easily.

According to the invention, there is provided a seat for an aircraft comprising a seat portion, a back portion which is movable between an upright position and a reclined position, and a back shell arranged behind the back portion, at least a lower portion of the shell being movable rearwardly to accommodate the back portion in the reclined position.

In the upright position, therefore, working space for maintenance, etc. is provided behind the back shell. However, when the seat moves into the reclined position, this space is filled. As a result, the fastenings behind the seat are easily accessible without any reduction in the cabin space available for passenger accommodation.

The present invention is defined in the accompanying independent claims. Some preferred features of the invention are recited in the dependent claims.

BRIEF DESCRIPTION OF THE DRAWINGS

The invention can be put into practice in various ways, some of which will now be described by way of example with reference to the accompanying drawings, in which:

FIGS. 12a) and b) illustrate a side view and plan of a fuller embodiment of the invention; and FIGS. 13a) and b) illustrate the seat of FIGS. 12a) and b) configured as a bed;

FIG. 30 shows schematically, the seat of FIGS. 29a) to 29d) in a partially reclined position.

DETAILED DESCRIPTION OF THE INVENTION

Figure 1:
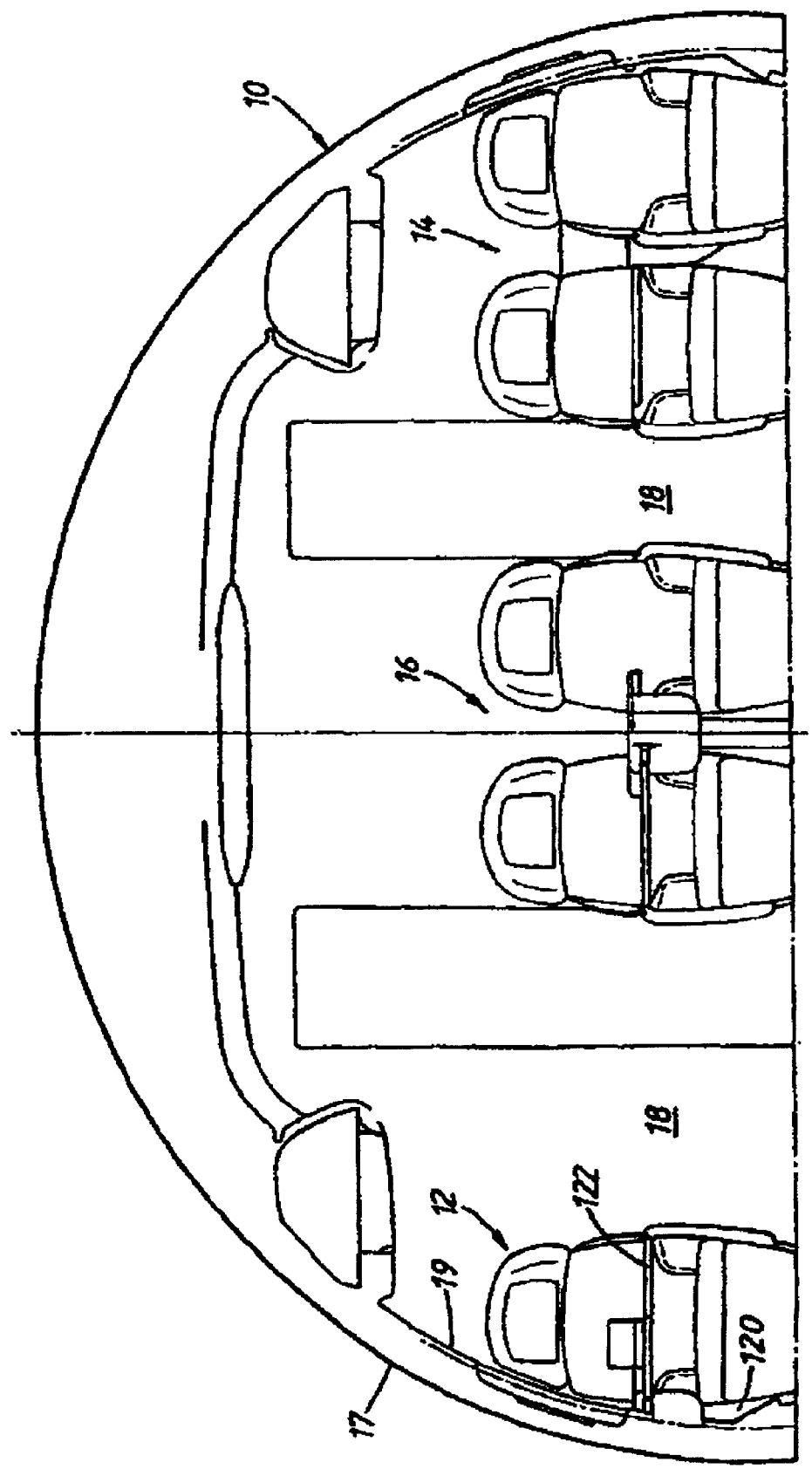
FIG. 1 is a partial lateral cross-section of an aircraft cabin.

Referring to FIG. 1 of the drawings, a cross-section through the first class cabin space of an aircraft fuselage 10 is shown. It comprises two outboard lines of seats 12/14 running fore and aft and a double inboard line of seats 16. The spaces between the lines of seats are the aisles 18 running generally along the aircraft. FIG. 1 illustrates two alternative cabin arrangements. To the left of the central broken line I—I, the outer line of seats comprises single seats 12. To the right of the central broken line, the outer row of seats comprises a double row of seats 14. The fuselage comprises an outer skin 17 and an inner bulkhead 19.

Figure 2:
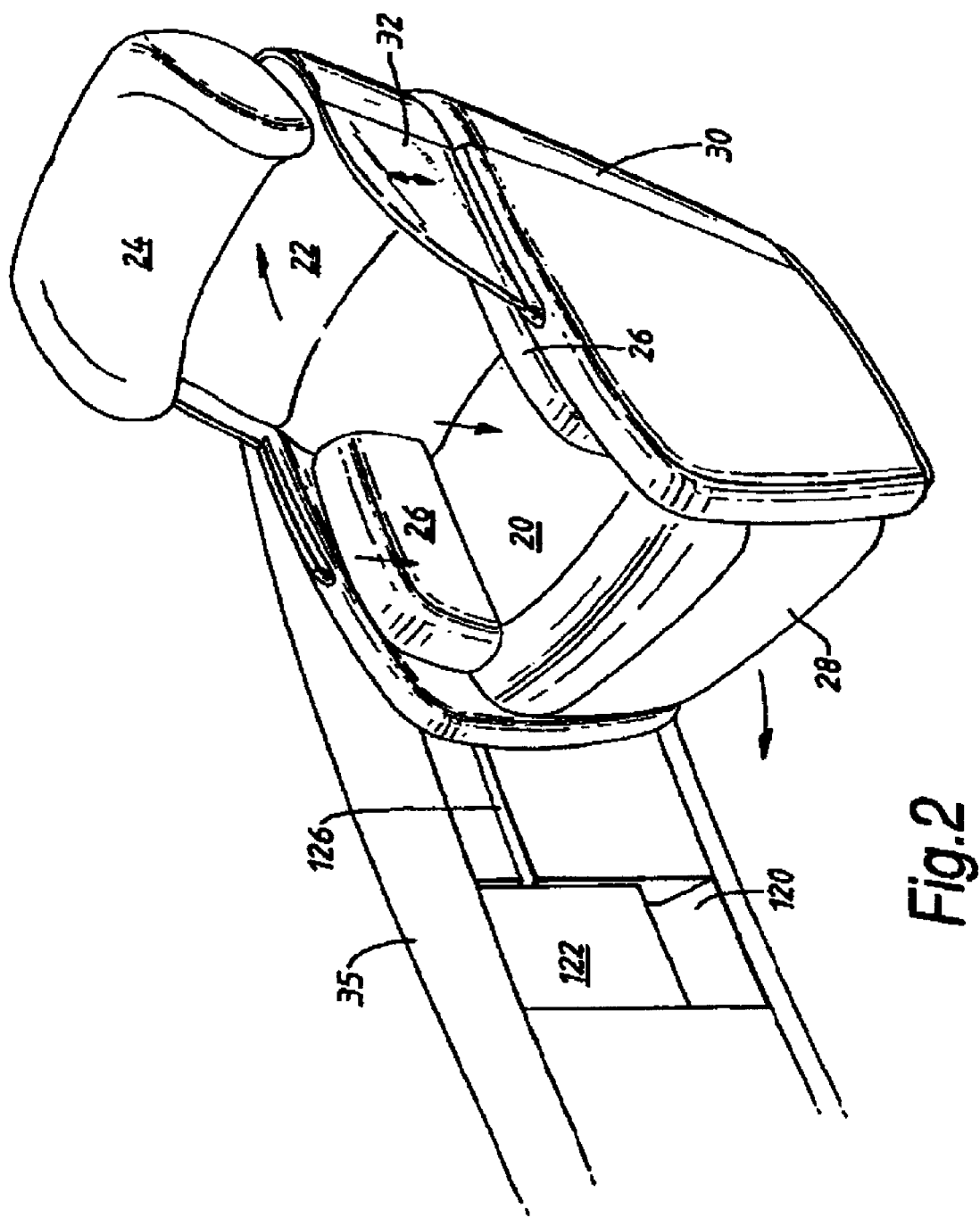
FIG. 2 illustrates a seat according to the invention.

One of the seats is shown in FIG. 2. In this case, it is a single line seat 12. It comprises a seat portion 20, a back rest 22, a head rest 24, a pair of side arms 26 and a leg rest 28. The seat components are contained within a seat shell 30. A privacy screen 32 is mounted on one or both sides of the shell 30, depending on the position of the seat relative to the others. An ancillary side unit 35 is positioned in the space between the seat and the aircraft bulkhead. The ancillary side unit 35 houses a storage locker, table and mountings for a combined seat and entertainment control unit.

The ancillary units 35 for a pair of central seats 16 extend between the seats on the sides remote from the respective aisles 18.

As with any conventional seat for an aircraft on a long haul route, it is important that it functions well both as a seat and as a place for sleeping. Turning a seat into a bed, while keeping to the space, weight and crash load requirements for an aircraft, involves compromises. Usually, this has resulted in the seat not transforming into a sleeping surface that is completely acceptably comfortable.

Figure 3:
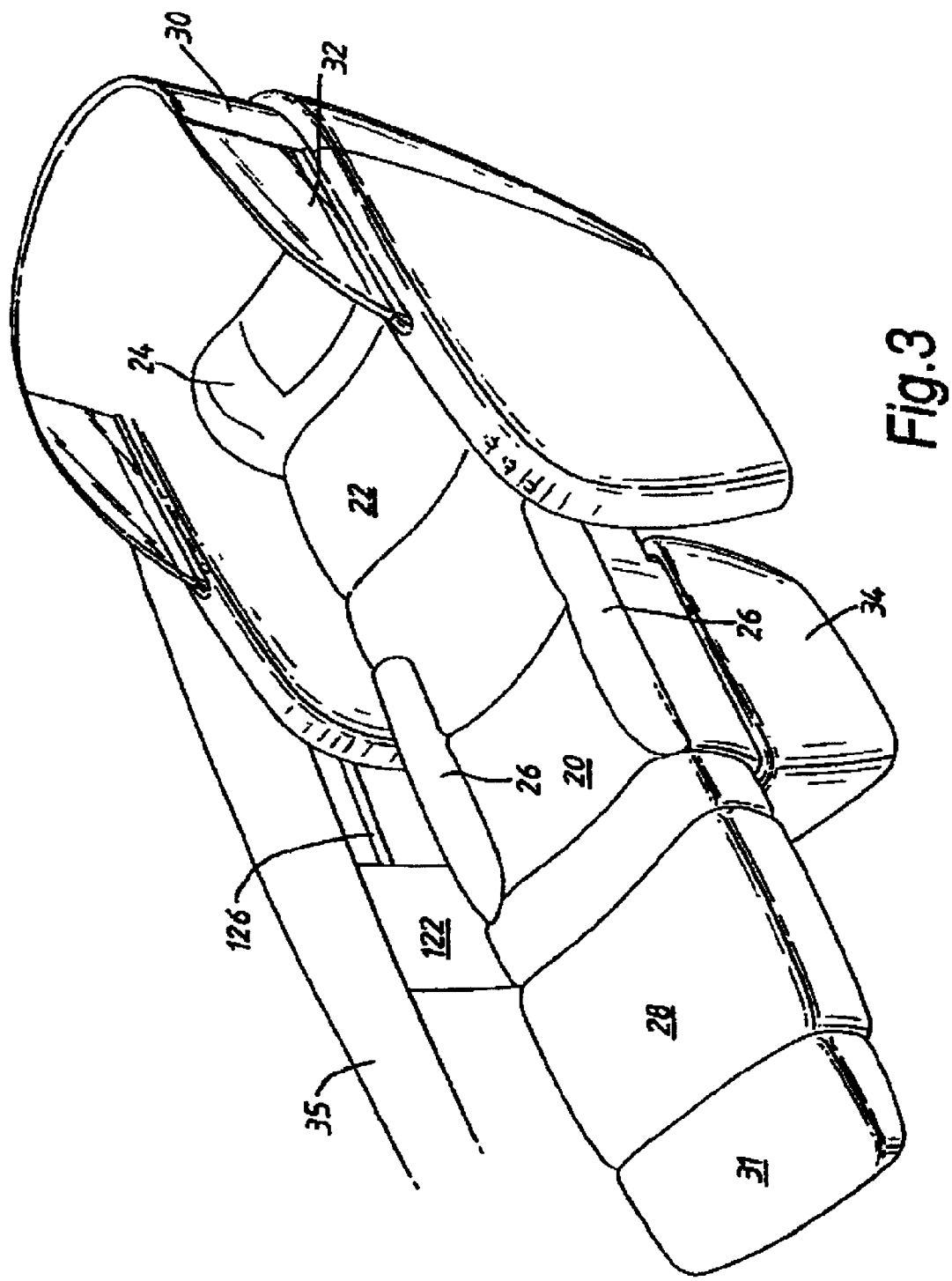
FIG. 3 illustrates the seat of FIG. 2 in a reclined position.

As indicated in FIGS. 2 and 3, the head rest 24 at the top of the back rest 22 projects out of the top of the rear of the shell 30 in the seat configuration. The various other components of the seat emerge outwardly from the open front of the shell to form a bed. The seat portion 20 slides forward supported on a slide 34. The leg rest 28 rotates upwardly about its connection with the seat portion 20. A foot rest 31 emerges telescopically from the projecting leg rest 28. As the seat portion 20 moves forward, the back rest 22 and the head rest 24 recline into a substantially horizontal attitude behind it.

In previous seats for aircraft, the comfort afforded by the seat in the bed configuration is compromised by the lack of width. To address this, the seat according to the invention also has the side arms 26 arranged to be movable with respect to the shell 30. The side arms more forward with the seat portion 20 as the seat is reconfigured into a bed, As a beneficial addition to the effective width of the bed, the side arms 26 are also collapsible to lie substantially flush with the upper level of the seat portion. In the recumbent position, the average person will find that his or her bottom would normally be adjacent the side arms 26 when they are advanced with the seat portion. Thus, by being able to retract the side arms, or otherwise move them out of the way, the effective width of the bed is optimized in the area where the width is often most needed.

Figure 5:
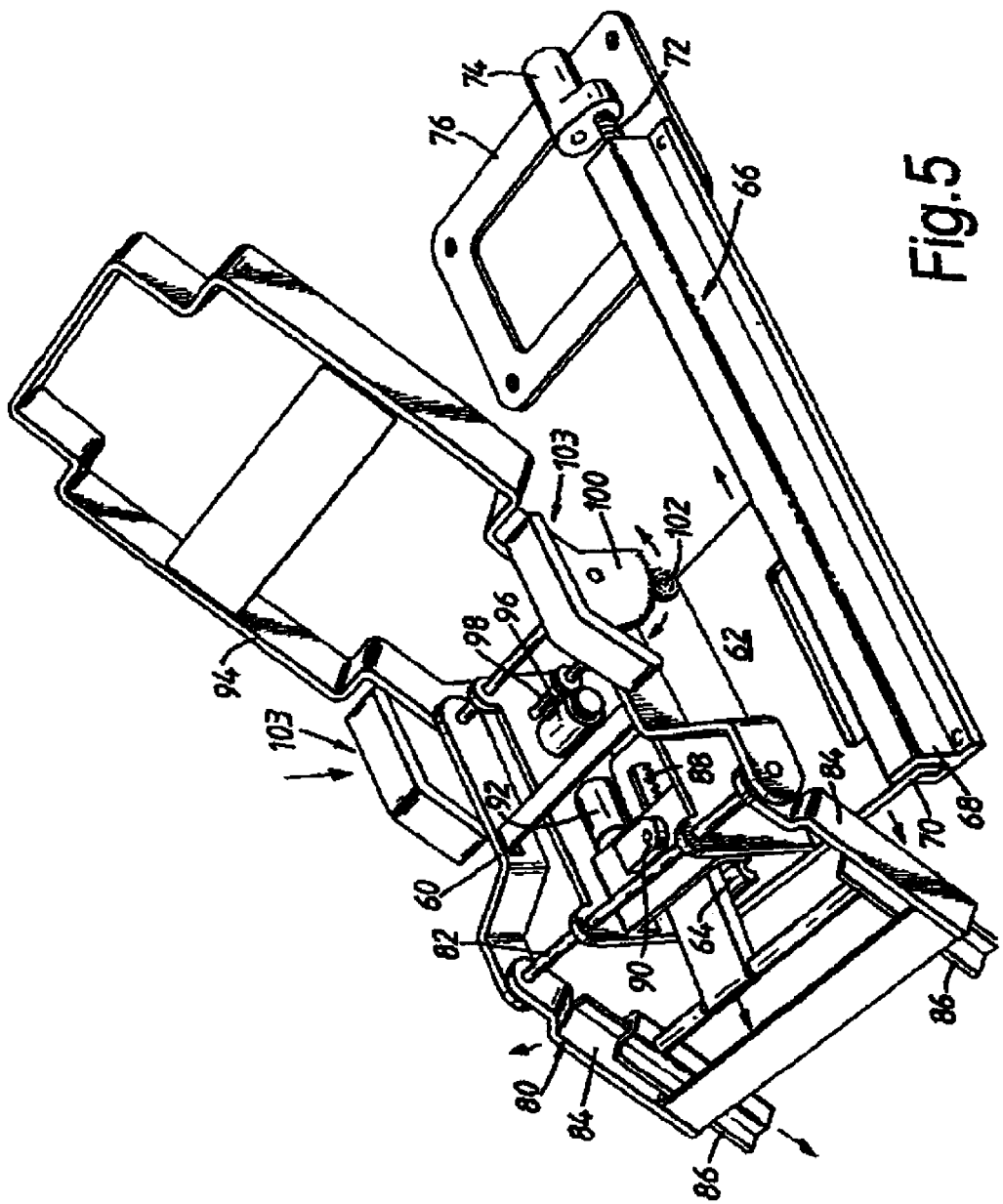
FIG. 5 shows detail the frame structure of the seat of FIG. 2.

In order for each arm to move out of the way, when the seat is arranged as a bed, it can move down flush with or below the seat as shown in FIGS. 3 and 5. Alternatively, it could retract sideways into the cladding. Furthermore, the arm may be arranged to move with the seat between seat and bed configurations or it could retract in the same position and not move with the moving seat. In these alternative forms, the effective width of the seat is increased by the retraction of either or both arms.

Figure 4:
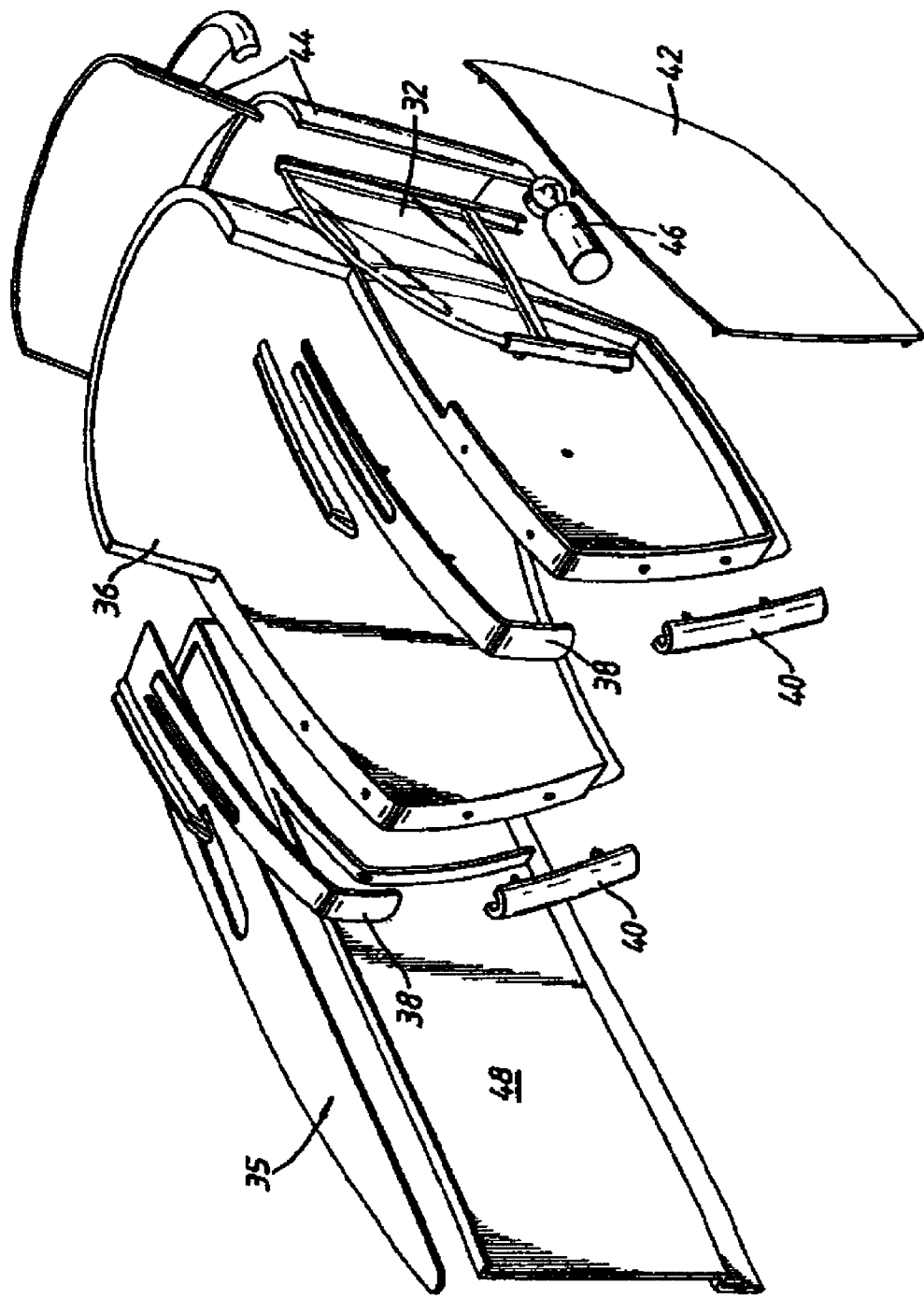
FIG. 4 is a fragmented view of the cladding and trim of the seat of FIG. 2.

FIG. 4 illustrates the components of the seat shell 30 and the adjacent ancillary side unit 35 for an outer seat. The shell comprises a main bucket part 36 that extends around the seat components. Various pieces of trim and cladding 38, 40, 42, 44 are mounted on the outside of the bucket. The privacy screen 32 is retractable within the space between one side of the bucket 36 and the side cladding 42 under the power of a motor 46 mounted to the bucket. The side of the bucket 36 and the cladding 42 define an aperture through which the screen 32 projects in the deployed position. The storage compartment is defined between the inner bulkhead 19 for the fuselage 10 and a side wall 48 which also forms cladding for the fuselage side of the bucket 36.

The utilities units for a pair of central seats 16 extend between the seats and the sides remote from the respective aisles.

One mechanism for driving the seat between the seat and bed configurations will now be described with reference to FIG. 5. The various cushions of the seat are mounted on an articulated frame arrangement. A seat frame 60 is mounted on a seat carriage 62 that is, in turn, mounted on a pair of wheels 64 (one shown), on one lateral side, and in a drive unit 66 on the other side. The drive unit 66 comprises a longitudinally extending retaining channel 68 into which extends a downwardly turned lip 70 of the carriage 62. The end of the lip runs on a set of ball races (not shown) in the channel 68. A threaded worm (not shown) attached to the rear end of the lip 70 is engaged by a worm screw 72 attached to a drive motor 74 mounted on a floor plate 76. The seat portion is driven backwards or forwards according to the rotation of the screw 72 as driven by the motor 74.

Figure 6:
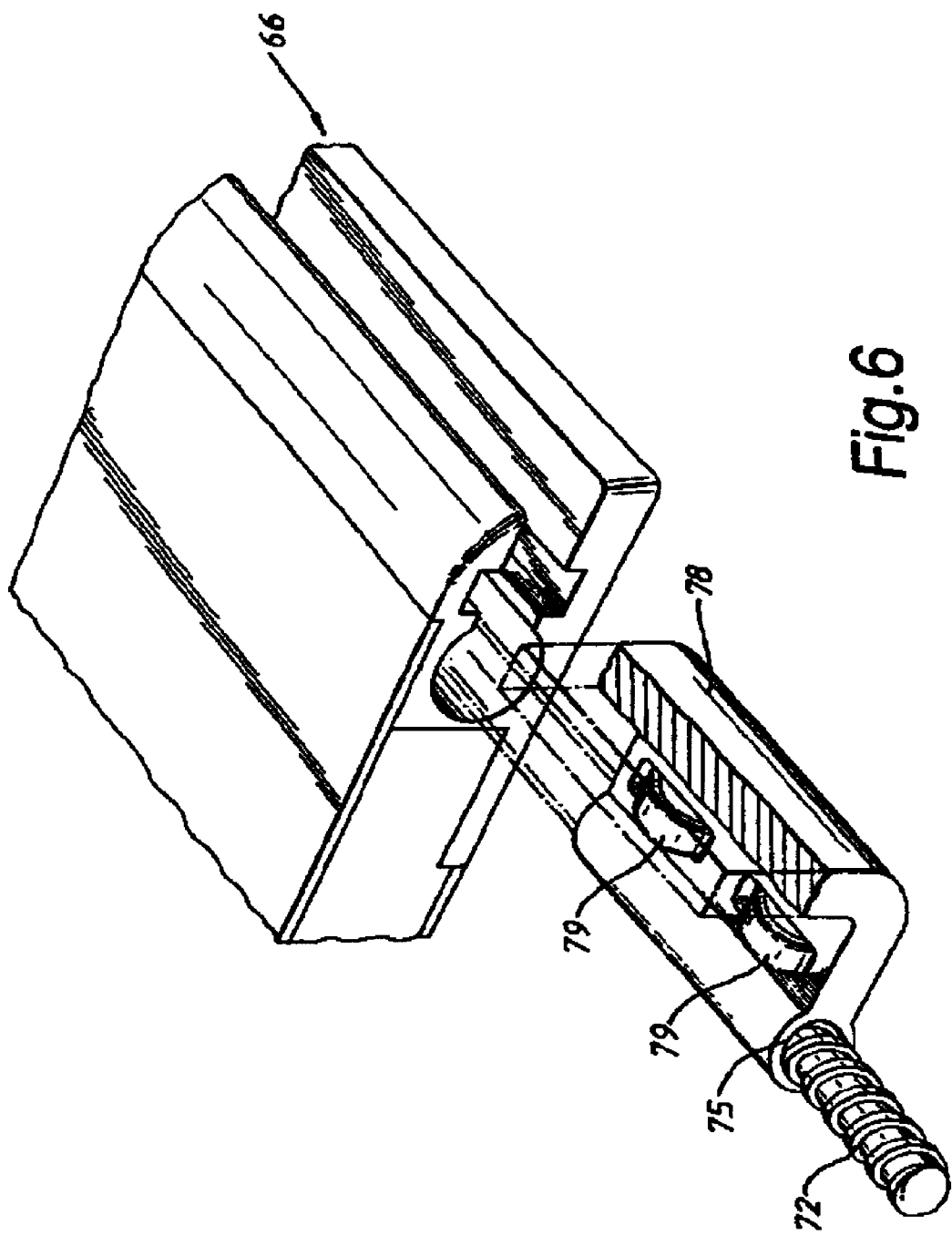
FIGS. 6 and 7 show detail of an alternative to part of the seat mechanism of the frame structure of FIG. 5.
Figure 7:
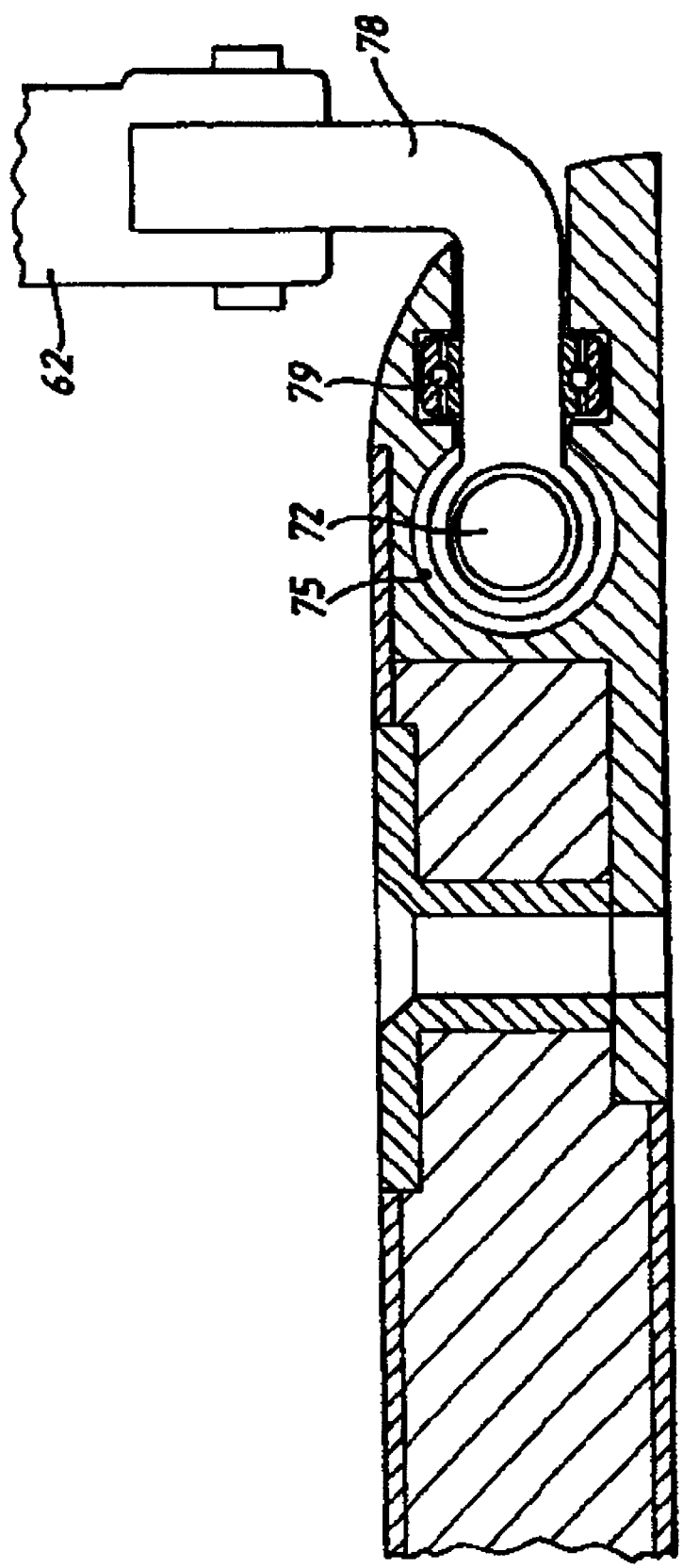

FIGS. 6 and 7 illustrate an alternative drive arrangement for the seat carriage 62. A carriage bracket 78 supports a pair of spaced ball races 79, the bracket is formed with an internally threaded hole 75. The hole is engaged with the worm screw 72 that is driven by the motor 74. As the screw 72 rotates under the power of the motor, the seat carriage, attached to the bracket 78, is drawn along the retaining channel 68 on the ball races 79.

A leg rest frame 80 is pivotably attached to the front of the seat frame 60 by a laterally extending front pin 82. The leg rest frame 80 comprises a pair of spaced members 84 on each of which is a slidable extension frame 86 for the foot rest 31. The extension frames 86 are driven by a rack and pinion 88/90 powered by a motor 92. As the leg rest 28 is deployed, the extension frame 86 is caused to project beyond the members 84 until prevented from further movement. Thereafter, the rack 88 drives the leg rest upwardly to lie substantially in the plane of the seat frame 60 with the foot rest 31 deployed.

A back frame 94 is pivotably secured to the rear of the seat frame 60. A motor 96 drives the back frame 94 to rotate about its pivot through a drive shaft 98 engaging a quadrant gear 100 through a gear wheel 102.

Each of a pair of side arm frames 103 comprises an articulated member which is pivotably secured at each respective end to the back frame 94 and to the seat frame 60. As the back is reclined, the distance between the two pivots of each side arm frame 103 is increased, causing the components of the side arm frame to be drawn flat. When the back frame 94 is lying substantially flush with the seat frame 60, the side arm frames also lie substantially in the plane of the seat frame 60. When the back frame is raised, each side arm frame 103 articulates about its joint to be raised into a deployed position above the level of the seat frame 60.

It will be appreciated by the person of ordinary skill in the art that the side arms can be raised and lowered in other ways, such as by being moved vertically, independently of the movement of the seat back frame. Also, the side arms can be moved in other ways so as to increase the effective width of the seat as a bed. For example, each side arm could be folded laterally sideways about a hinge extending fore and aft in relation to the seat, so that it rolls into the seat shell to present a side surface flush with the seat surface.

Instead of a mechanical frame defining the side arm, it is possible to use an inflatable arm bladder which is deflatable to collapse the arm rest for sleeping. The arm bladder is inflated by an air pump and vented using an electrically operated valve assembly, as will be apparent to the skilled person.

Figure 8:
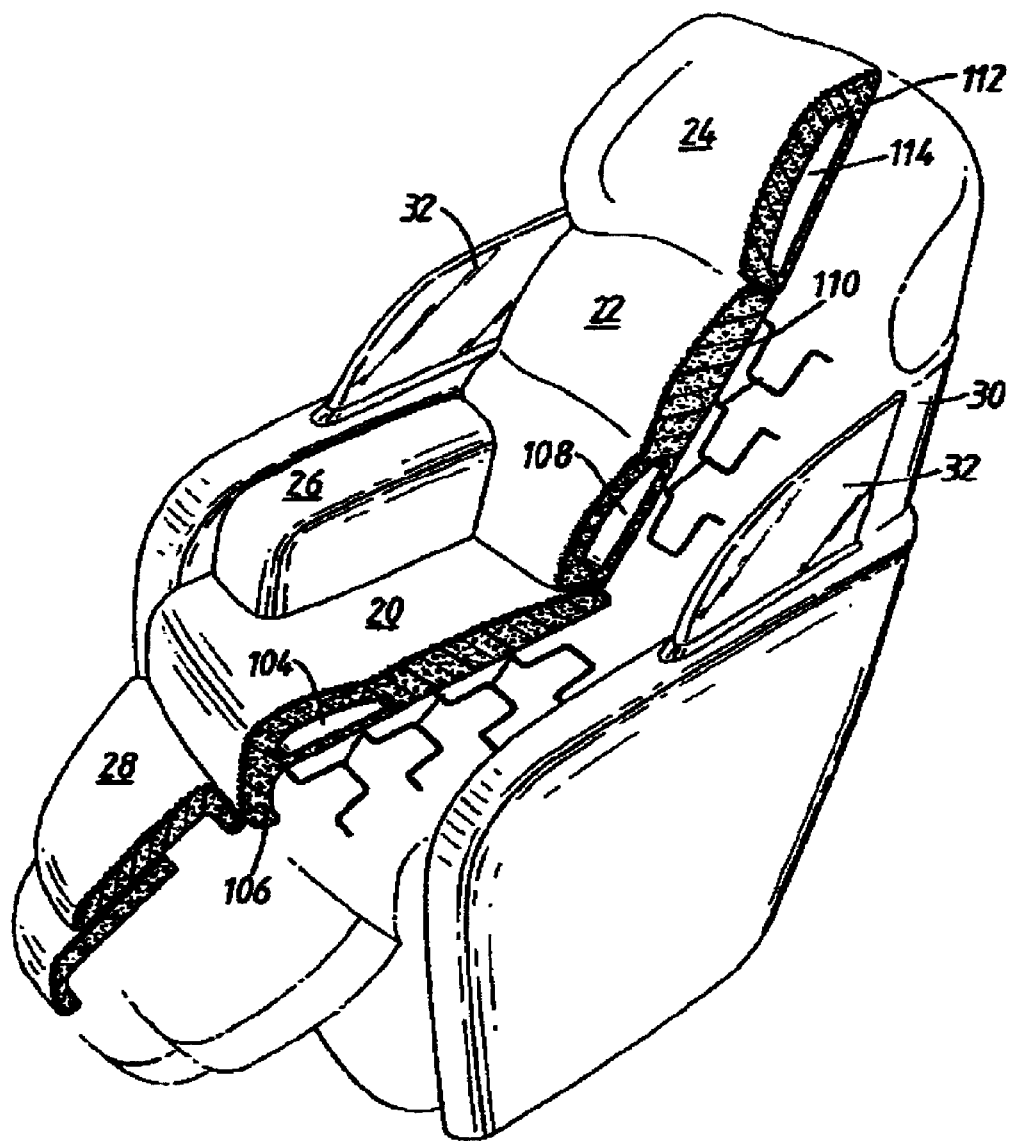
FIG. 8 is a cut-away view of the seat of FIG. 2.

In FIG. 8, the semi-reclined seat is shown partially cut away to illustrate the cushioning. While it is possible to orientate the components of the seat to make a substantially flat bed of the components themselves, it can be mechanically more convenient to arrange the seat frame components simply to adopt a more undulating profile in the fully reclined position. However, this is not completely satisfactory as a bed because the protruding parts of the human anatomy can coincide with the higher parts of an undulating seat surface and, similarly, recesses in the human anatomy can coincide with troughs in the seat surface. To counter this, the seat has an inflatable front bladder 104 within a seat cushion 106 towards the front thereof. There is also an inflatable lumbar bladder 108 in the base of a back cushion 110. By inflation of these two bladders, it is possible to compensate for the undulations in the seat cushions to provide support for those parts of the body to either side of the hip. Similarly, the head rest cushion 112 has a head bladder 114 in it which can be inflated to create the effect of a pillow of a height which is comfortable to the user.

The bladders are individually inflated by electrically driven air pumps and deflated using electrically operated vent valves. The skilled person will be aware of the suitable air pumps and vent valves. These will not be described further here except to point out that the most suitable type of equipment will fit in the seat or be mounted in the side unit adjacent to the seat.

Figure 9A:
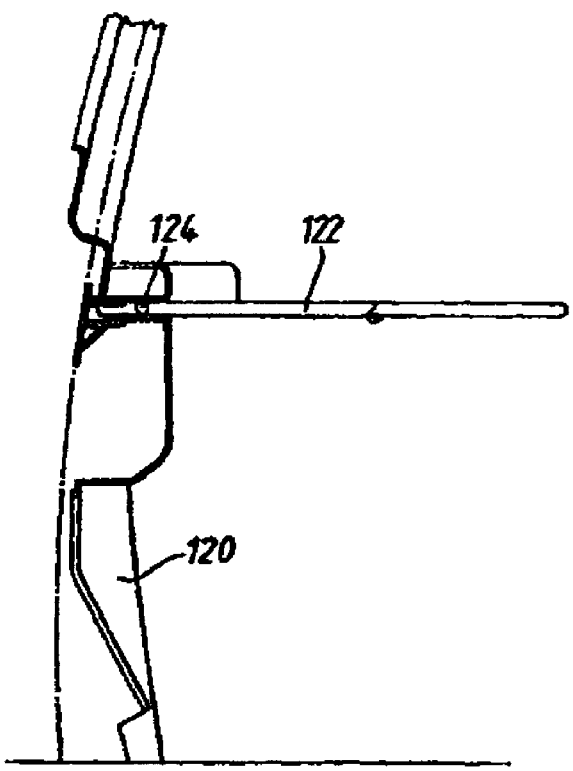
FIG. 9 is a partial lateral cross-section of the bulkhead of the cabin of FIG. 1.
Figure 9B:
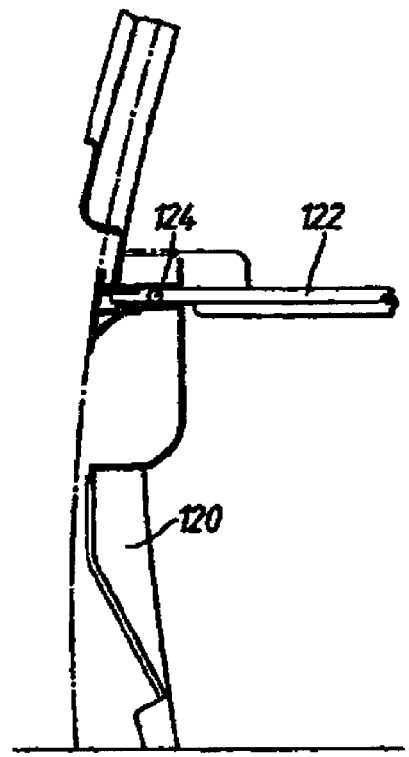
Figure 9C:
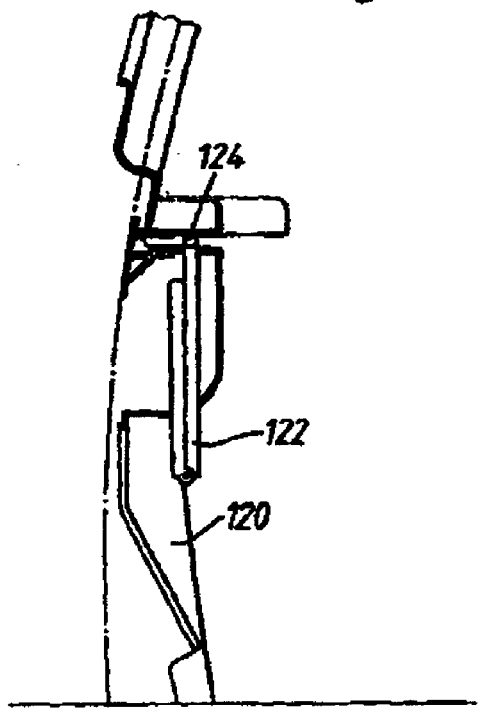

Referring to FIGS. 9a)–c), as part of the fuselage side utilities mat 35, there is a foldable table. The moulding of the storage locker is formed with a recess 120. A table surface 122 is hingedly supported toward the top of the recess on a shaft 124. The shaft 124 extends along a groove 126 in the storage locker (see FIGS. 2 and 3). By rotating the table surface 122 about its hinge into a horizontal attitude, the end nearest the shaft comes into registry win the groove 126 and can be slid along the groove towards the seat, and the seat occupant, for use. The table surface 122 is received in the groove 126 and is thus maintained in the horizontal attitude. When the table is finished with, it can be pushed back to line up with the recess, folded and stored substantially flat next to the storage locker.

Figure 10:
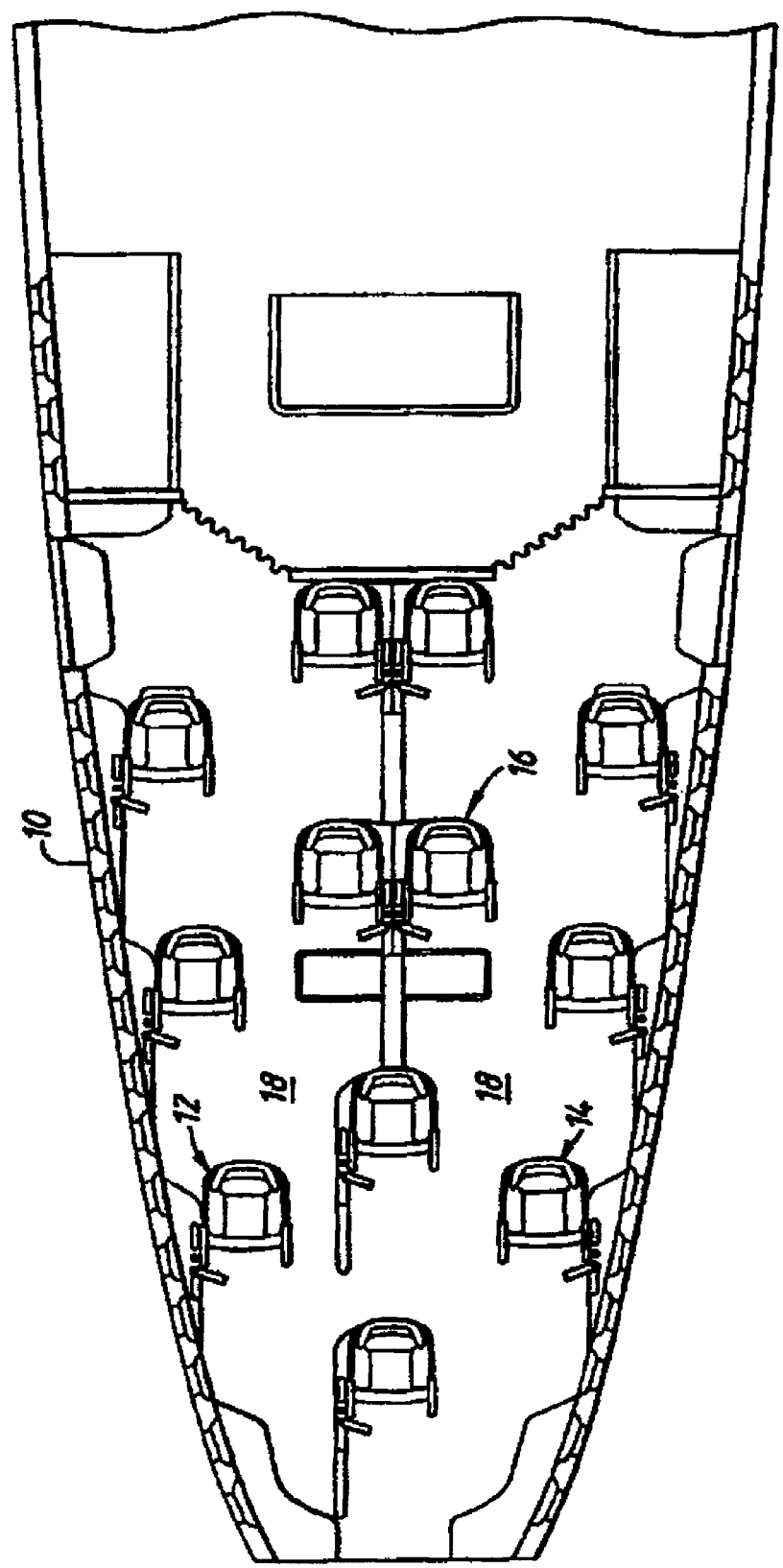
FIGS. 10 and 11 are plans of alternative seating arrangements for the cabin of FIG. 1.

The arrangement of seats 12, 16 is illustrated in FIG. 10 for a first class cabin of twelve seats in a wide bodied aircraft, such as a Boeing 747. All the seats in the cabin are arranged facing parallel with the axis of the fuselage 10. As a primary concern in the provisions of comfortable surroundings for first class travel is privacy, the lines of seats are arranged in a staggered relationship. The single outer seats 12 are longitudinally out of alignment with the double inner seats 16. The staggering also affords more room to maneuver in the aisles 18 as the widest parts of the seats, i.e. across the sides of the seat shell, are not coincident. The seats are all shown in the seat configuration. It will be appreciated that each seat according to the invention is able to assume a bed configuration.

Figure 11:
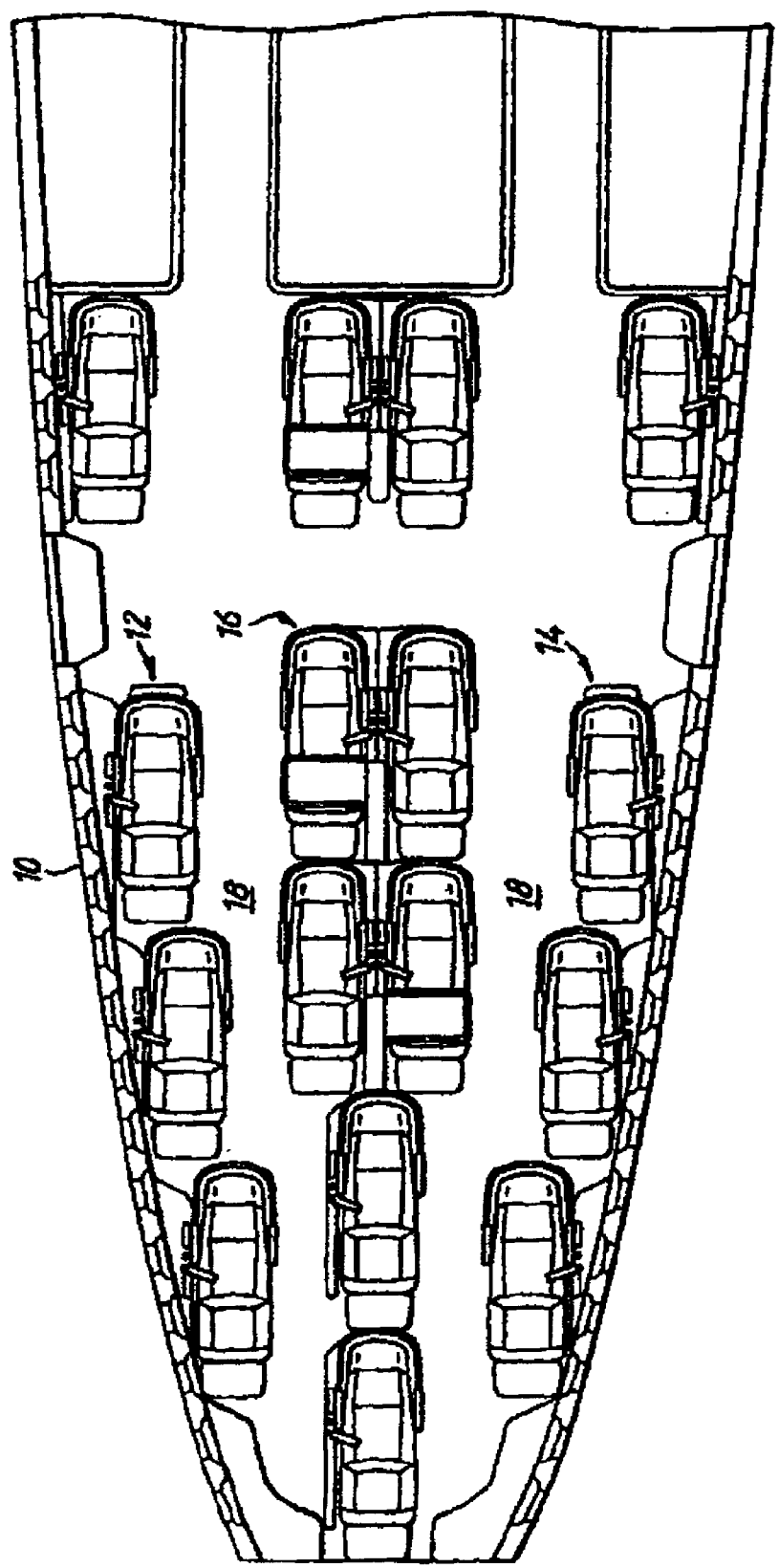

FIG. 11 shows a sixteen seat arrangement for a first class cabin in which the lines of seats are again staggered while remaining facing parallel to the axis of the fuselage. It will be seen that the rear seats of the three rows in this embodiment are in alignment because of space requirements. As with the seats in FIG. 10, the seats in FIG. 11 are able to assume either a seat or a bed configuration, although they are shown in the bed configuration.

FIGS. 12a) and b) and 13a) and b) illustrate a further form of seat according to the invention. In this embodiment, the seat comprises a seat portion 200, a seat back (including a headrest) 202, and a leg rest 206 which are all mounted between a pair of side flanks 208. In the seat configuration, the seat back 202 extends upwardly out of the side flanks 208. An orientable head rest 204 is mounted on the top of the seat back 202.

A back shell 210 is pivotably suspended between the side flanks 208. The back shell comprises a back portion 212 and a pair of wings 214 which embrace the back rest. 202 afford privacy to the seat user at head level. A motor (not shown) is arranged to drive the back shell 210 as the seat is reclined. The back shell 210 tips forward to accommodate the lowered head rest 204 as shown in FIG. 13a).

A forward console or shelf arrangement 215 for some ancillary equipment is positioned in front of the seat. It comprises a pair of side walls supporting a lower shelf 216 which defines a lower storage space 218 for small items of luggage, such as a briefcase or vanity case. The top of the forward console 215 is formed with an inclined top surface 22. This inclined top surface 220 acts as a discouragement to the seat occupant from placing drinks on the unit.

A retractable table 222 is stowed in the region below the surface 220. The table 222 is mounted on a carriage, on one side, which is received in a slot 224 in the bulkhead moulding 226 of the utilities unit. The table 222 can be slid along the slot 224 to a position above the lap of the seat user without the need to reorient it from another (e.g., vertical) stowed position.

Ancillary equipment and controls for use by the seat occupant, as are typically found in the first class cabin of a commercial aircraft, are arranged along the bulkhead moulding 226 near the seat. The moulding 226 is bolted both to the adjacent side shell 208 and to the forward console 215. Typical ancillary equipment includes a magazine rack 230, a foldable cocktail table 232, a combined telephone and seat controller 234, an ash tray 236 and a television monitor 238.

The seat is rearranged into a bed similarly to the way previously described. The seat portion 200 is slid forwards under motor power. As this happens, the seat back 202 and the headrest 204 follow, reclining above the space vacated by the seat portion 200.

It will be seen from FIG. 13*a*) that the end of the head rest 204 protrudes rearwardly beyond the ride flanks 208. A pivot 240 about which the back shelf 210 tilts forwardly is closer to allow the bottom of the back shell 210 to accommodate this fully reclined position of the head rest 204. The pivot 240 is located across the wings 214 (FIG. 12), above the base of the seat back 202 where it meets the seat portion 200. Thus, as the seat back is reclined, the path swept by the head rest 204 is accommodated by the tilt of the back shell 212 which causes the base of the back shell to move outwardly into a gap 242 in front of the seat behind. Thus, in contrast to previously known reclinable seats, the back is perceived to tilt forward away from the space of the passenger behind as the back rest is reclined.

The forward console or shelf arrangement 215 of the seat behind is spaced from the seat in front by the gap 242 into which the base of the back shell 202 projects. This outward movement of the back shell 202 is unobserved by the passenger to the rear because of the forward unit. The only movement observed by the passenger to the rear is of the back shell pivoting forwardly, as the seat back is reclined, or backwardly into the upright position, as the seat is moved into the seat configuration. When the seat is arranged into the seat configuration, the back shell 202 only moves towards the gap 242 and does not encroach upon the territory of the passenger to the rear, as defined to the front by the front end of the console 215.

As the seat back 204 is reclined and the seat portion 200 moves forward, the leg rest 206 is raised and a front rest 244 moves out. In the bed configuration, the leg rest and the foot rest lie substantially parallel with the seat portion, projecting into the well of the console 215 defused between the shelf 216 and the stowed table 222. To support the extended leg rest 206 and foot rest 244, a pin (or pins) on the end of the foot rest locate a socket in the wall of the forward unit. Alternatively, the leg rest and/or the foot rest could rest on the shelf 216.

The seat portion is movable either on a carriage, or by means of a slide assembly as shown in FIG. 5. Similarly, FIG. 5 illustrates how the articulation of the component parts of the seat can be achieved. It would also be apparent to the skilled person that the articulation of the back shell relative to the side shell can be put into effect using a similar motorized gear mechanism.

The motorized movements of the seat described above are controlled and coordinated by a controller that is software programmed accordingly. To configure the seat as a bed or a seat, the occupant has only to press the correct button on the seat control panel. The coordination of the movement of the seat components in the embodiments described herein under software control is not part of this invention and will not be described in any further detail. Also, while automatic coordination of movement of the seat components is required when changing the seat into a bed, and vice versa, the movement of the leg rest, the foot rest, and any desired intermediate position for the back rest relative to the seat portion is independently controllable by the seat occupant.

FIGS. 14 to 24 show further embodiments of the invention. In FIGS. 14*a*) and *b*), the seat units for opposite outboard single lines of seats 12 comprise a seat 300, a side unit 302 for storage and a front console 304 which is connected with the side unit 302. The seat 300 is accessed from the side opposite the side unit 302.

Referring to FIGS. 14, 15, 16 and 17, it will be seen that the seat comprises seat sides or side flanks 306 and a back shell 308, having side wings 309, which is movable with respect to the flanks 306. Within the moveable components of the shell, a seat back 310, a seat portion 312 and leg rest 313 are configurable as a seat or a bed as before.

As the seat components are moved between upright and bed configurations, the back shell 308 first moves backwardly and downwardly and tilts forwardly about a lower pivot point P to accommodate the head rest of the moving seat back 310. Then, as the seat moves further towards the bed configuration, the back shell 308 tilts further, shifting further rearwardly and dropping to provide a full bed length.

The seat 300 will be required for use in a position intermediate to the upright and bed configurations at some times. While the seat portion 312 can provide the seating surface simply by moving on, for example, a slide as described above, it is preferable that the seat portion 312' tilts upwardly at the front in the intermediate positions such that the user is cradled about the hip while seated. This is considered to be a more comfortable intermediate position than if the seat was simply horizontal, in which arrangement the user tends to slip forward on the seat over time.

As with previous embodiments, the user's feet in this embodiment are received within a foot well 346. However, in this embodiment the front structure 304 defining the foot well is formed with a recess in which a television monitor 348 is stored. Also, the foot well 346 is usefully used to accommodate a stowed table 350. The table is supported on one side in a channel 352 by means of a carriage arrangement 324 which is shown in more detail in FIG. 19. The carriage has a rubber brake 326 which is actuated to engage a surface of the channel 352 in order to brake the table in position by a series of linkages and a hand-operated lever (not shown). Thus, the table is already in a deployed arrangement even in the stowed position. The channel for the table extends into the region of the arm rests of the seat in order that the table can be pulled up close to the body of the user seated in the upright position (See FIG. 17*b*).

Figure 20B:
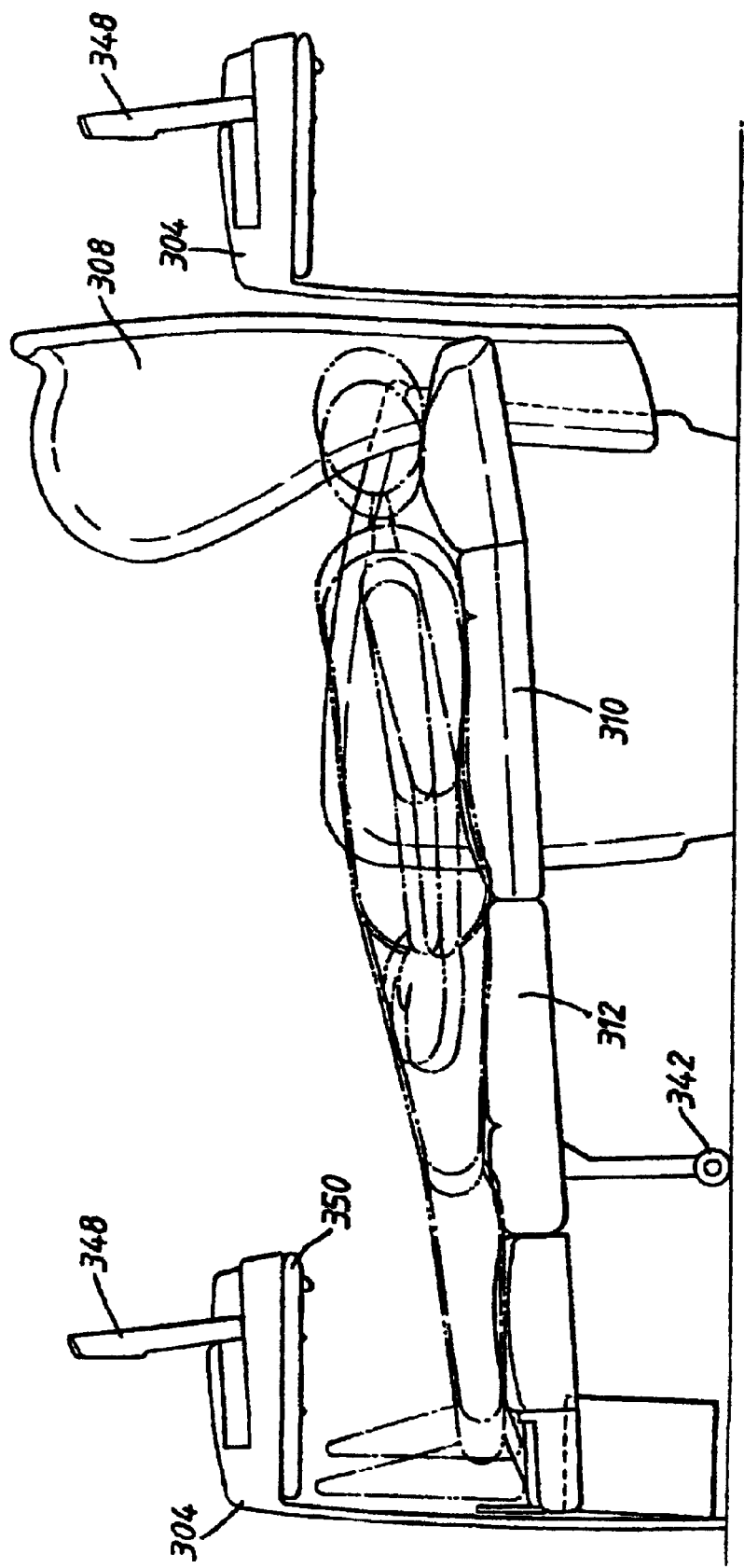
FIGS. 20a) to d) illustrate a further embodiment of the invention in use.

FIGS. 20*a*) to *d*) illustrate a further alternative form of the invention in which the seat is supported by a dolly wheel 342 that extends from beneath the seat portion 312 toward the front.

Figure 20C:
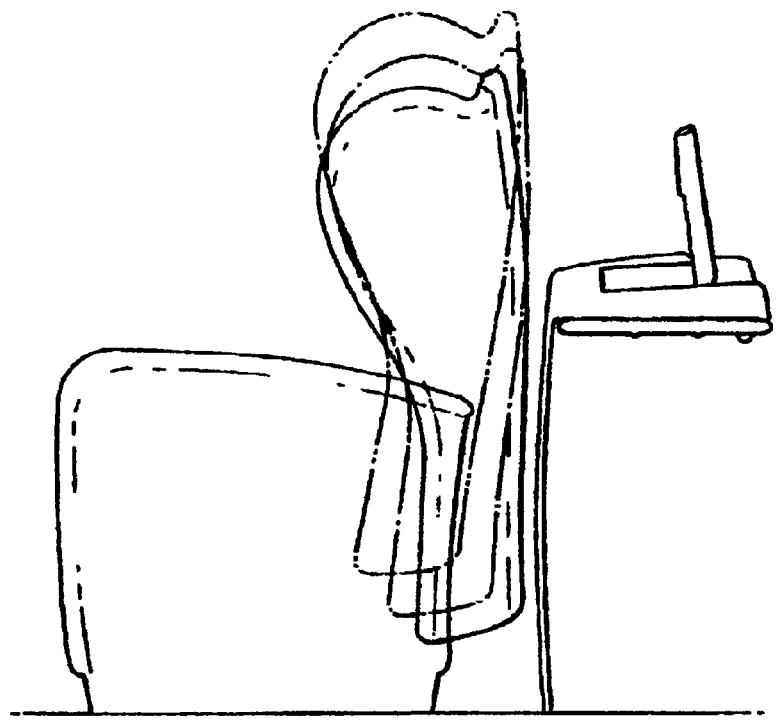
Figure 20D:
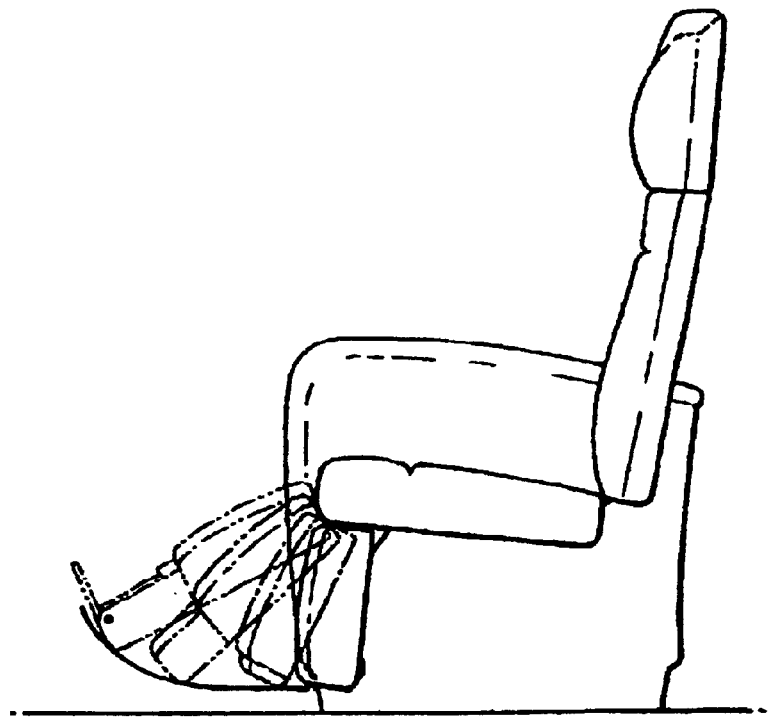
Figure 21A:
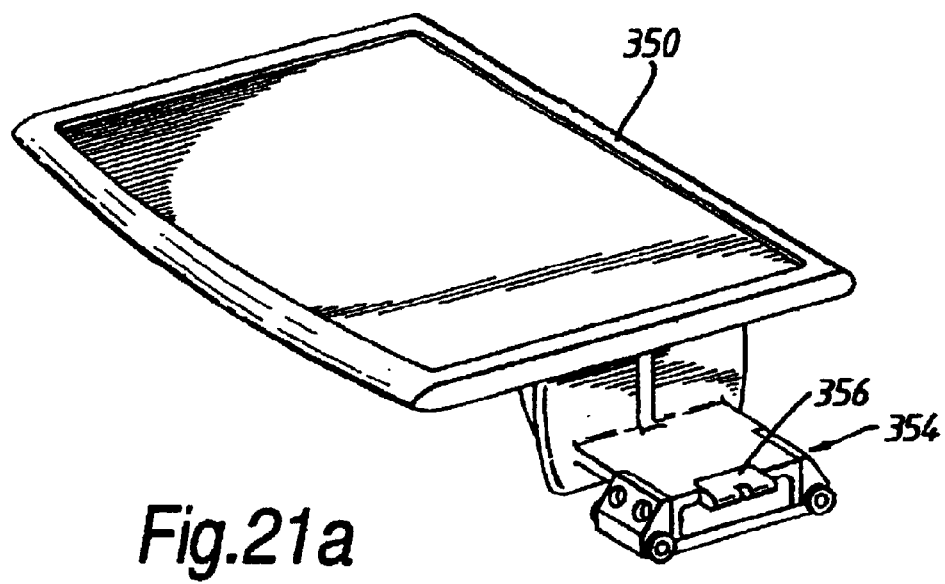
FIG. 21 illustrates detail of a table and carriage.
Figure 21B:
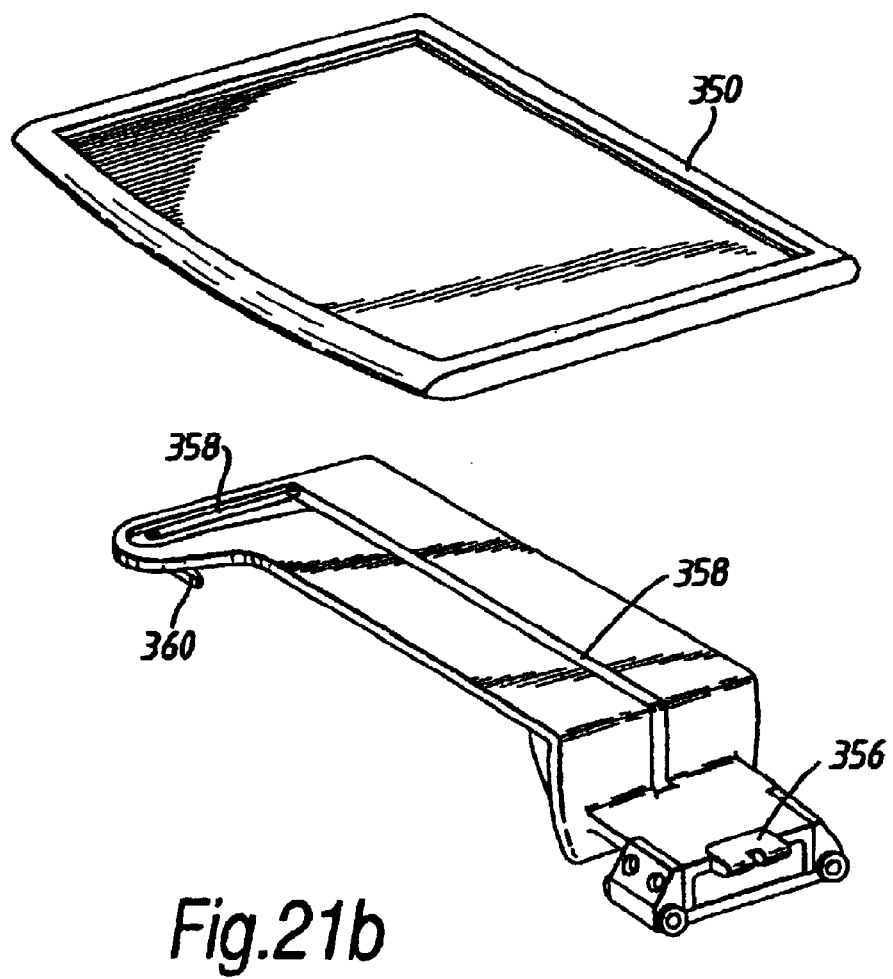

Also in this embodiment, the orientations of the seat back shell 308 in the upright, intermediate reclined and bed positions is shown in FIG. 20*c*). It will be seen that the shell drops downwardly as the seat is relined and then tips forwardly as the head rest reaches the bed position in order to accommodate the full bed length. In this way, the seat back shell does not extend over the front console 304 of the seat unit behind.

FIG. 17 illustrates the movement of the back shell 308 as the seat is adjusted between the seat and the bed configurations. Position A is for the upright seat. Progressing to the intermediate position, the back shell 308 firstly begins to drop downwardly through position B so that the wings 309 of the shell 308 move generally with the head rest, maintaining the same degree of privacy at head level for the seat occupant. Thereafter, as the head rest is lowered to the bed configuration, the back shelf tilts forward to position C about a pivot point P which is located about one-third of the length of the back shelf from the bottom. In this way, the wider (upper) parts of the wing 309 of the back shell 308 are closer to the seat flanks, maintaining the sense of privacy for the seat occupant when lying down. It will be apparent from FIG. 17 that the pivot point P is fixed relative to tile back shell 308.

Figure 18A:
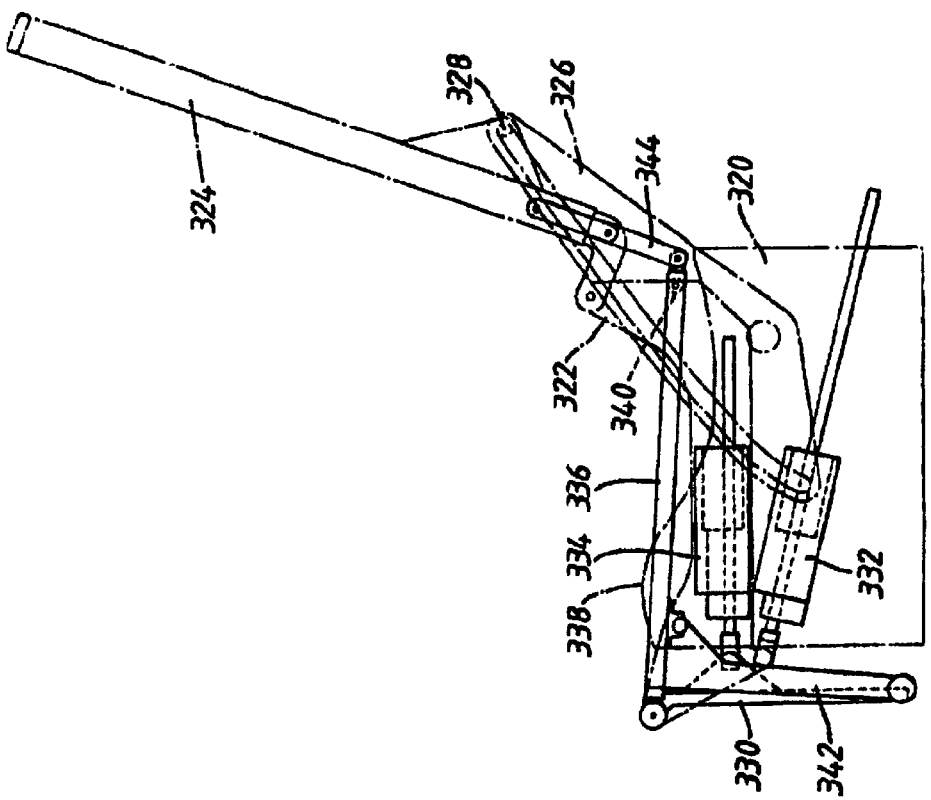
FIGS. 18a) to c) illustrate a seat mechanism.
Figure 18B:
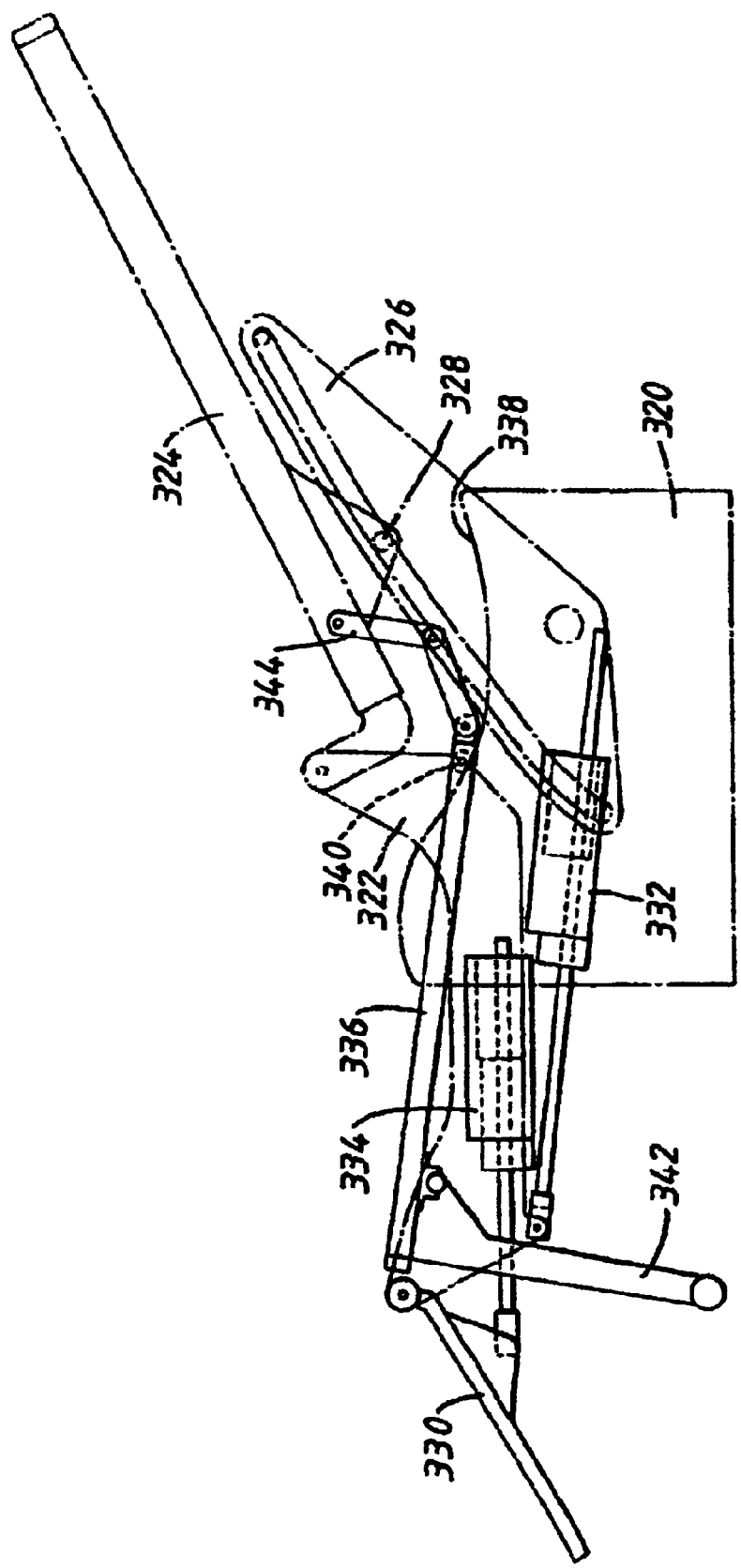
Figure 18C:
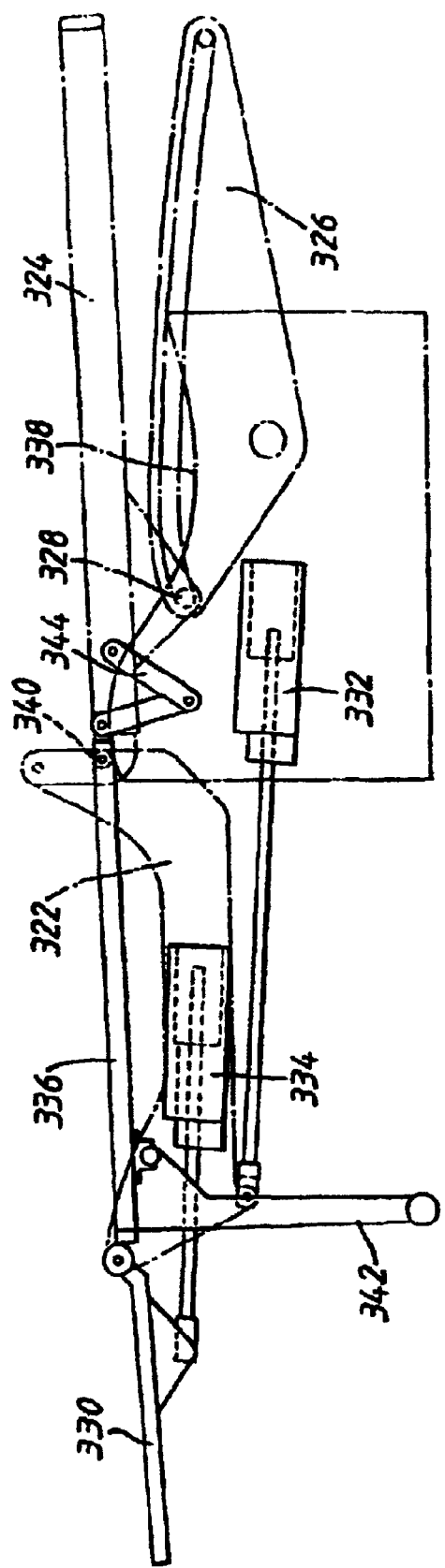
Figure 19:
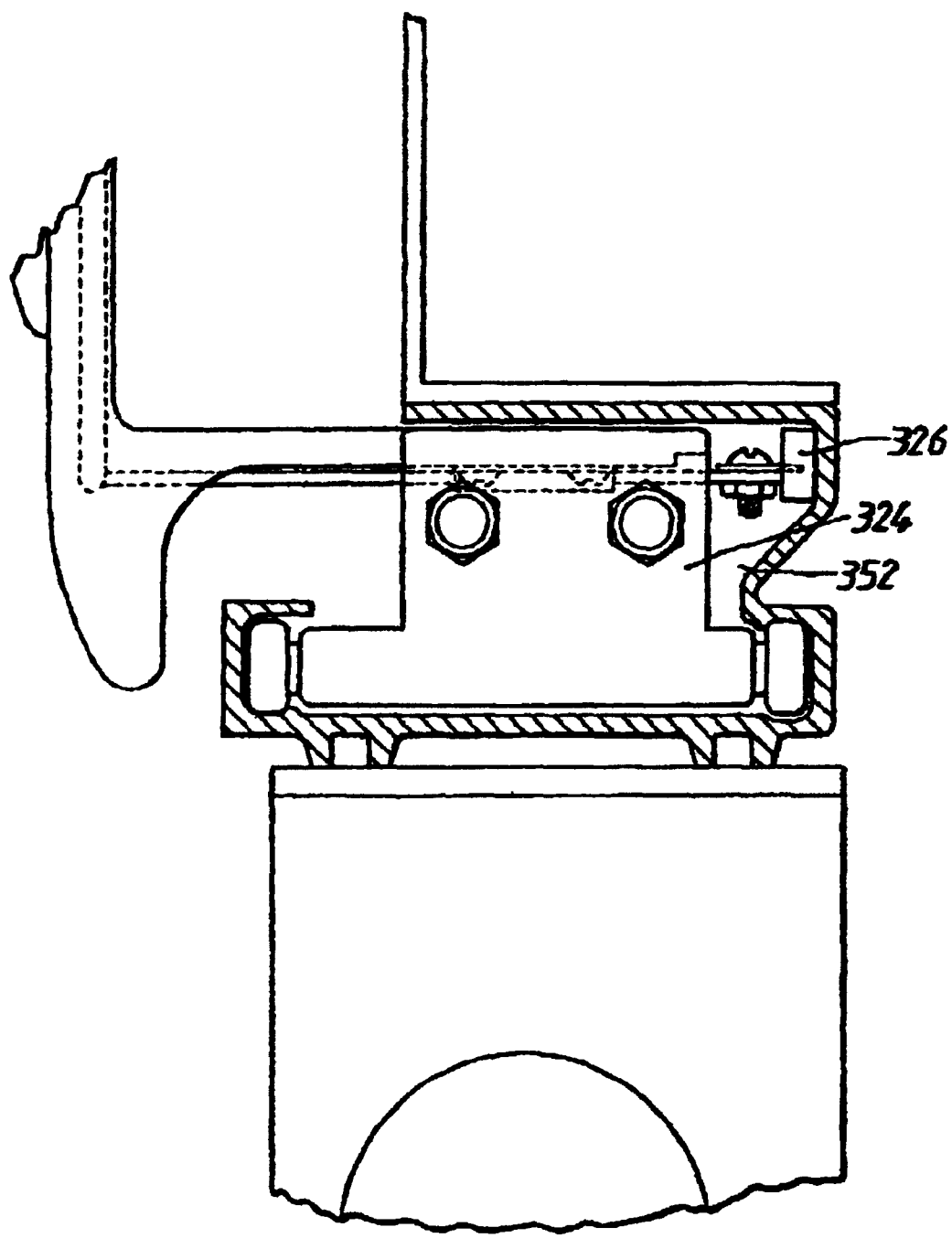
FIG. 19 illustrates a detail of a table carriage.

One mechanism by which the seat components are movable is shown in the upright, intermediate and bed configurations in FIGS. 18a) to c). The mechanism comprises a pair of side members 320 (one shown) which support a seat frame part 322 which is movable forwardly on a slide arrangement (not shown). As the seat frame 322 progresses forwardly, it takes with it a hingedly connected back frame 324. The path followed by the back frame 324 is dictated by a slotted member 326 along which rides a bearing 328 attached to the back frame 324. An independently actuated leg rest frame 330 is hingedly connected with the forward end of the seat frame 322. A first hydraulic actuator 332 is connected between one or each of the side members 320 and the seat frame 322. A second hydraulic actuator 334 is connected between the frame 322 and the leg rest 330.

A seat sub-frame 336 is hingedly connected with the forward part of the seat frame 322. The sub-frame 336 supports the seat portion 312 of the seat. It will be noted that an upper edge 338 of the side member 320 is formed with an undulating profile on which rides a bearing 340 connected with the rear end of the sub-frame 336. An articulated linkage 344 is pivotably connected between a point towards the lower end of the back frame 324 and the end of the sub-frame 336. A dolly wheel 342 is attached to the front of the sub-frame 336. As with previous embodiments, a foot rest (not shown) is telescopically received in the leg rest 330.

From the upright position shown in FIG. 18a), it will be seen that the linkage 344 is filly extended, holding the back of the sub-frame up above the edge 338. The seat frame 322 moves forwardly out of the member 320, taking with it the sub-frame 336 and drawing down the back frame 324. The slotted member is free moving, altering its attitude as the base of the back frame 324 is drawn forward by the moving seat frame 322. As the back reclines, it lowers the sub-frame gradually to rest on the edge 338. The sub-frame 336 follows an initial trough in the profile of the edge 338. This lowers the rear of the seat portion 312 in the intermediate positions to cradle the hips of the seat occupant. Thereafter, the rear of the sub-frame 336 is caused to rise on the profile, such that the seat part is substantially in a plane with the seat back 310 in the fully reclined bed configuration.

In the bed configuration, the dolly wheel 342 supports the otherwise cantilevered seat frame 322. The leg rest and foot rest are independently acceptable. However, to configure the seat as a bed, movement of the leg rest 330 and the foot rest are also automatically coordinated with the progression of the seat frame 322. While hydraulic actuation is shown, it is possible to actuate the seat components in other ways, such as by direct motor drive as previously described.

Figure 22:
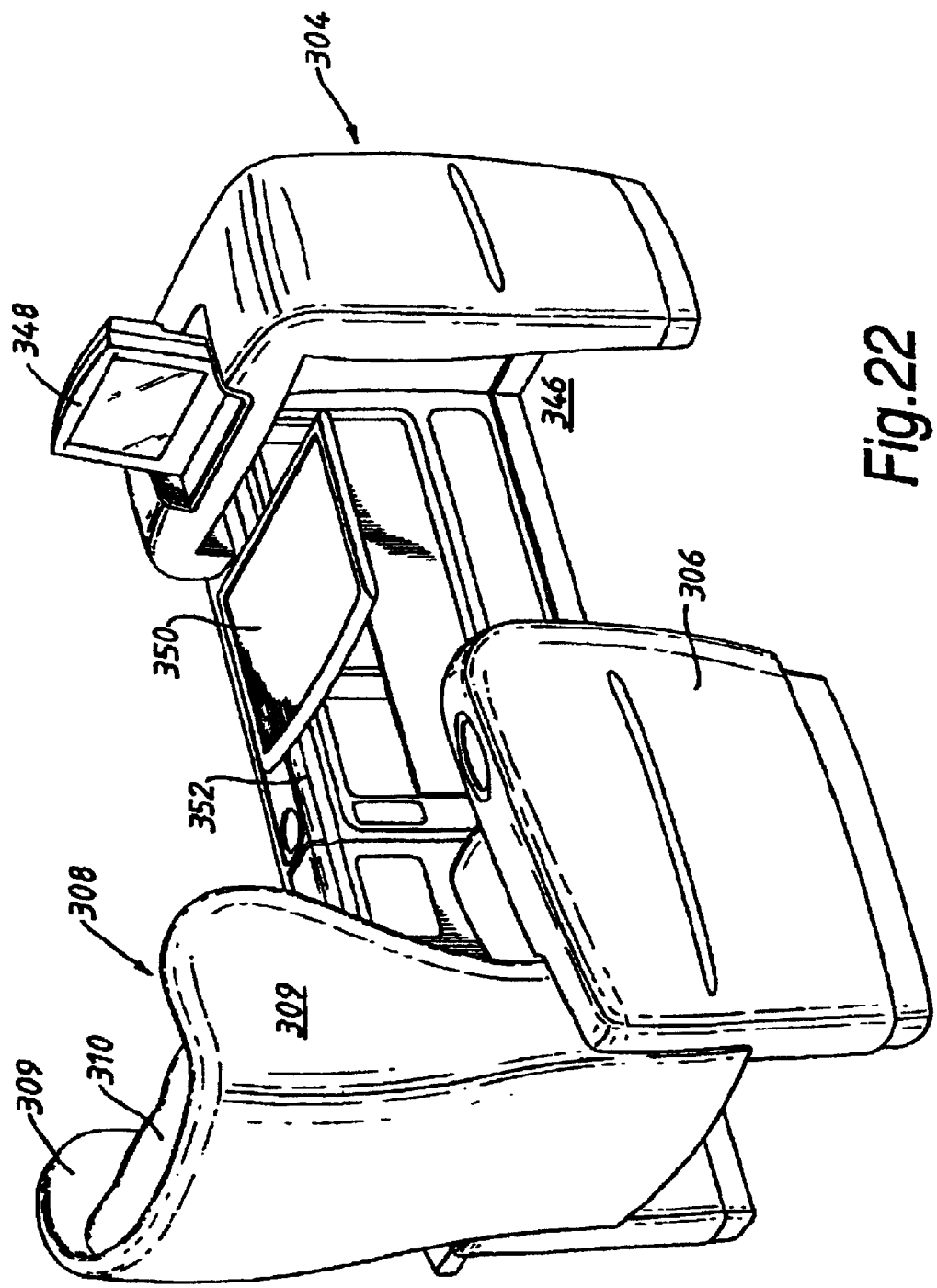
FIG. 22 illustrates the table of FIG. 21 in the seat of FIG. 14.

With reference to FIG. 22, as with previous embodiments, the leg rest and foot rest in this embodiment are received within a foot well 346 in the forward console 304 in which a television monitor 348 is stored. The television monitor 348 is pivotably mounted on a slide on which it can be rotated flat and slid back into a storage slot in the top of the console 304 or slid out and erected to provide a screen facing the seat occupant. Also, the console 304 is usefully used to stow a table 350. The table is supported on one side in a channel 352 by means of a carriage arrangement 354 which is shown in more detail in FIGS. 21a) and b). The carriage has a friction brake 356 which is biased to engage a surface of the channel 352 in order to brake the table in position by a series of linkages 358 and a hand-operated lever 360. Thus, the table 350 is already in a deployed attitude in the stowed position. The seat occupant simply has to pull on the lever 360 both to release the table 350 and pull it out for use. The channel 352 for the table extends into the region of the arm rest formed in the top of the flank 306 in order that the table can be pulled up close to the body of the user seated in the upright position (See FIG. 22).

Figure 14A:
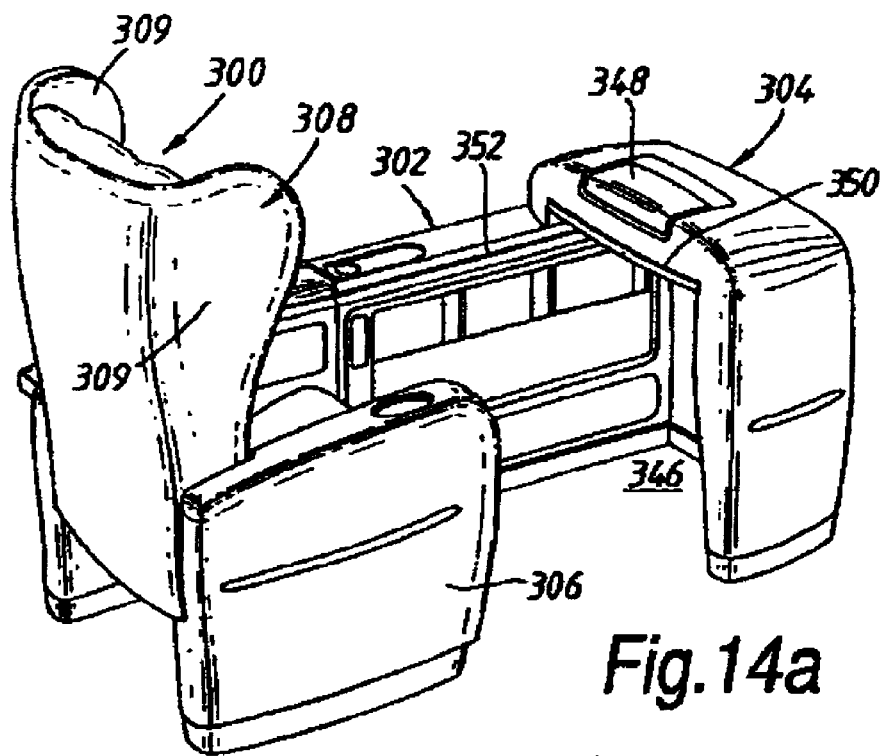
FIGS. 14a) and b) illustrate a further embodiment of the invention.
Figure 14B:
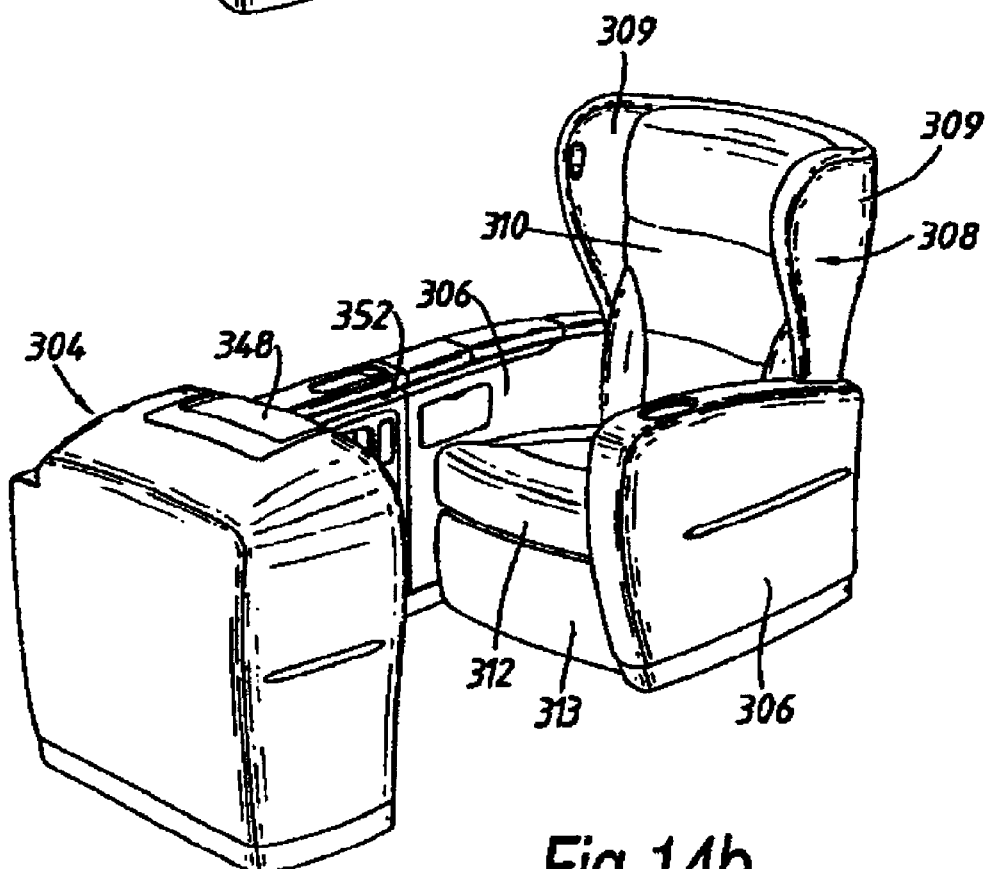
Figure 15A:
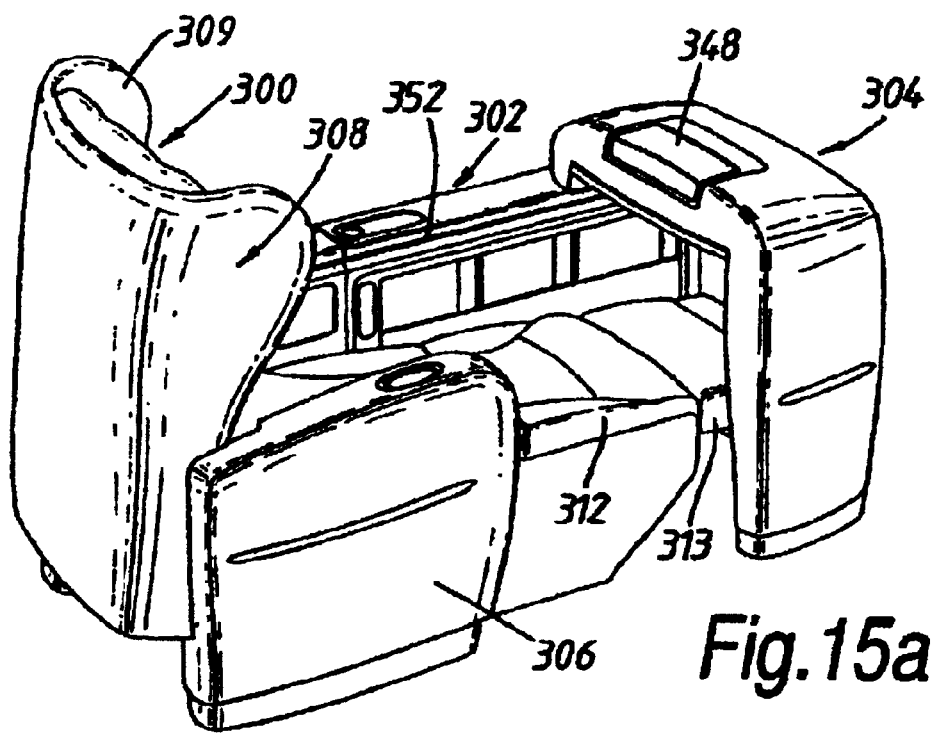
FIGS. 15a) to e) illustrate the seat configuration of FIG. 14 in a bed configuration.
Figure 15B:
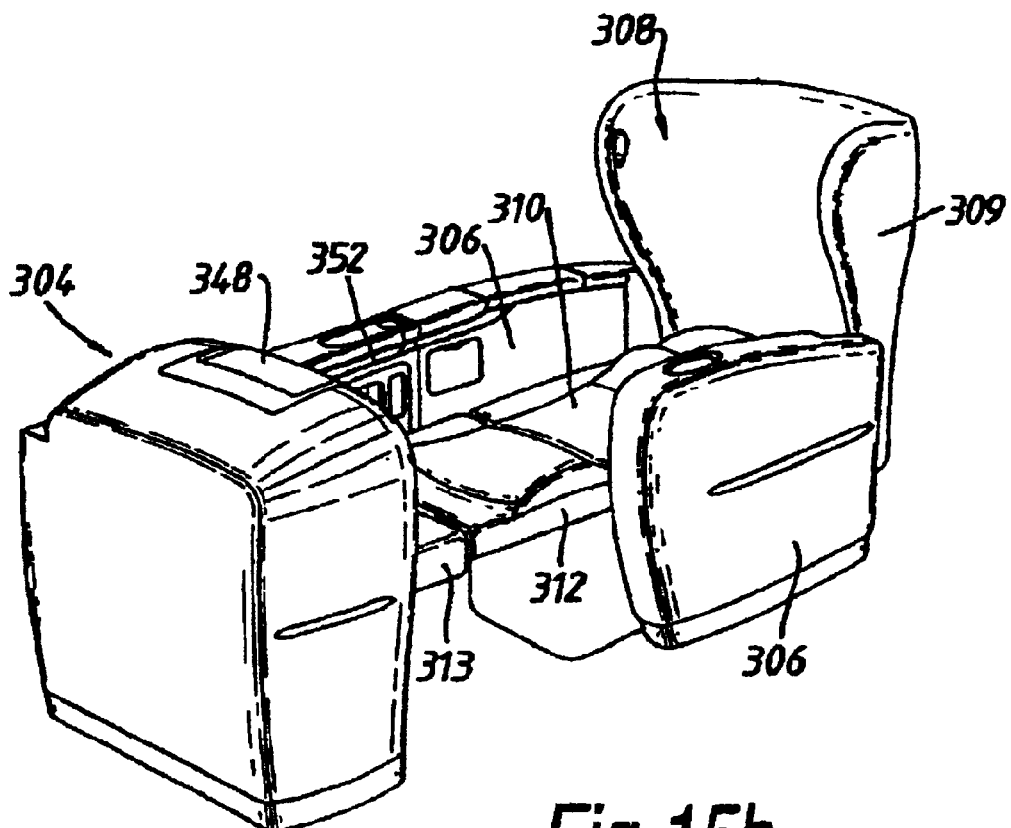
Figure 16A:
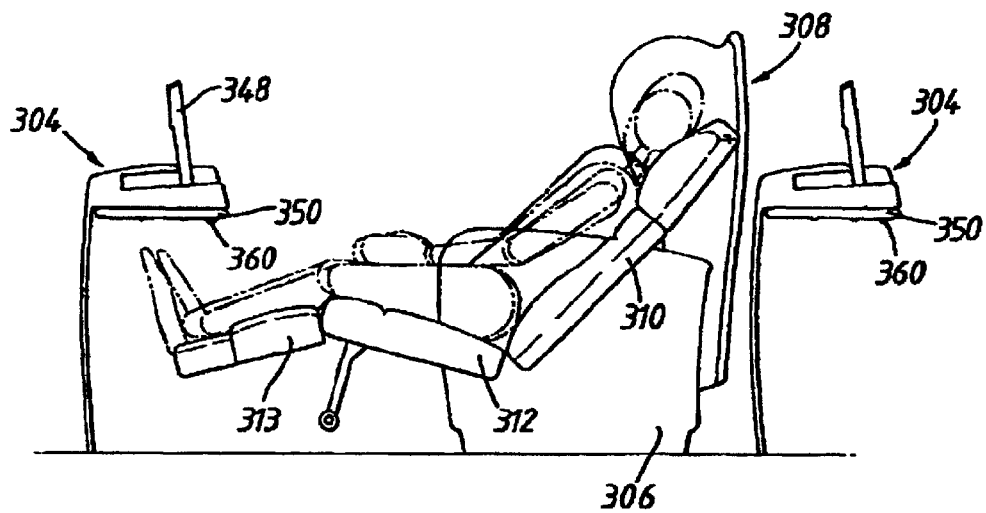
FIGS. 16a) and b) illustrate the seat of FIG. 14 in use.
Figure 16B:
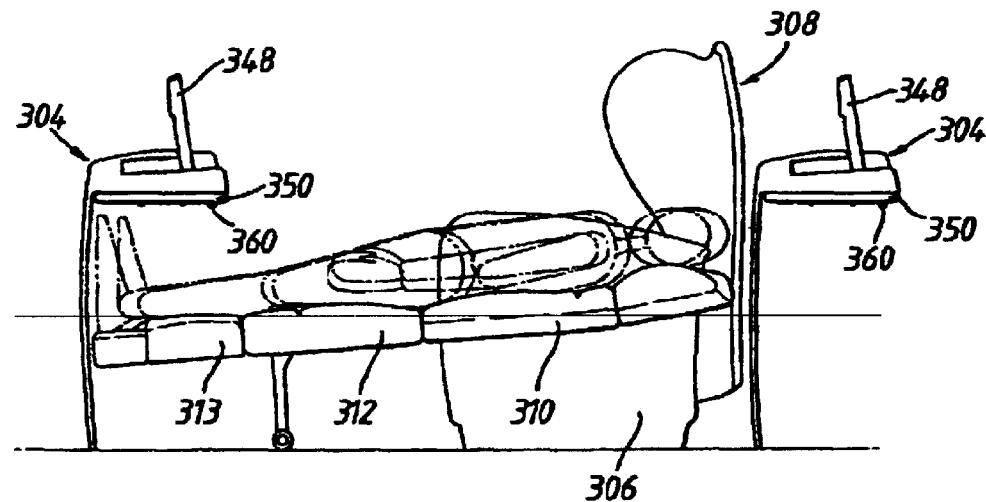
Figure 17A:
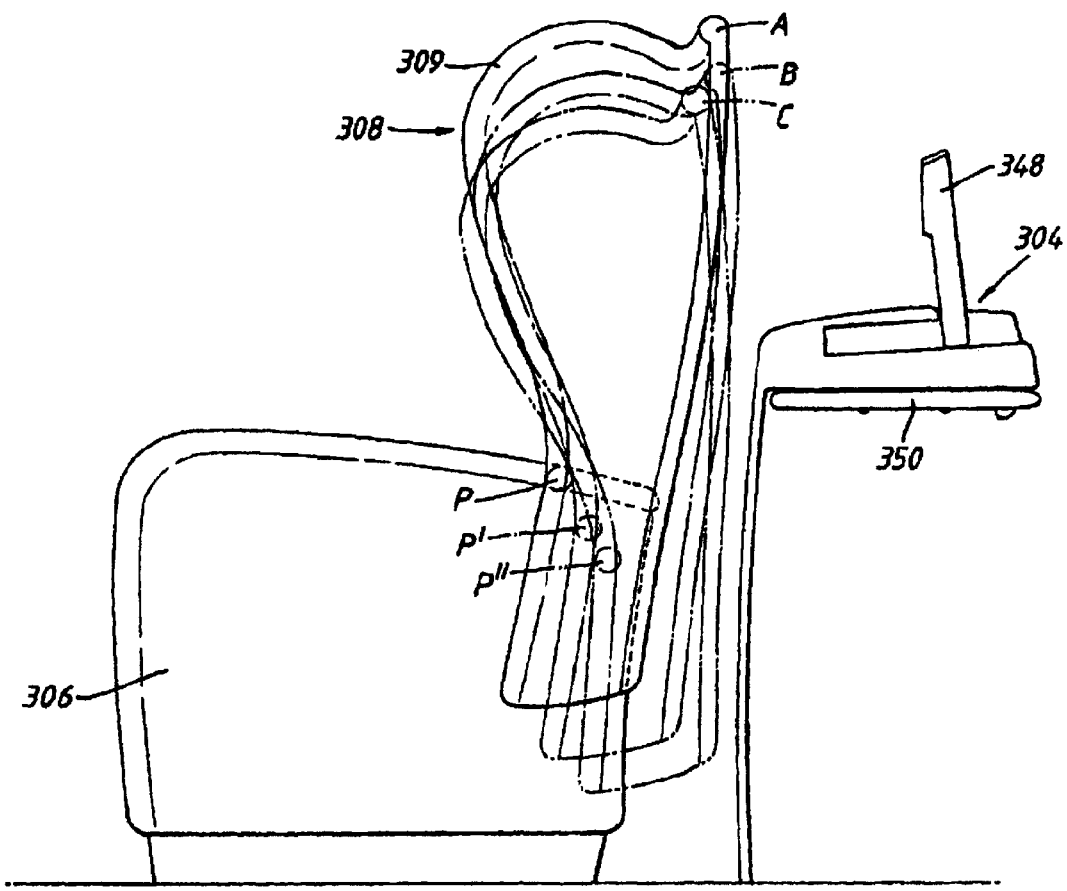
FIGS. 17a) and b) illustrate the movement of part of the seat of FIG. 14.
Figure 17B:
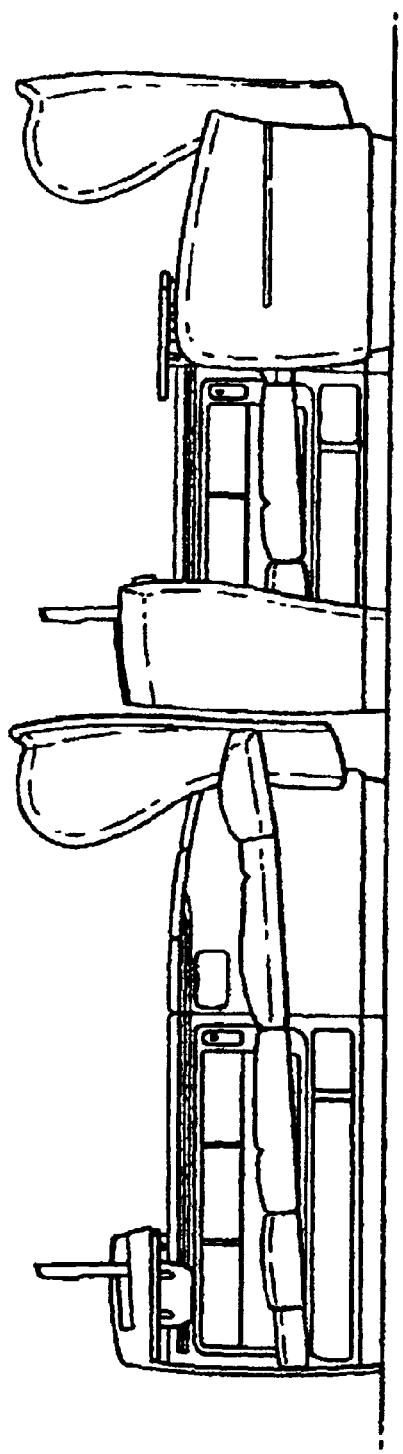
Figure 17D:
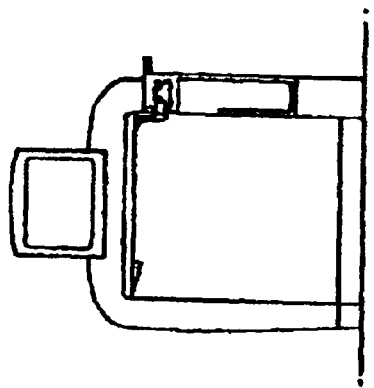
Figure 17C:
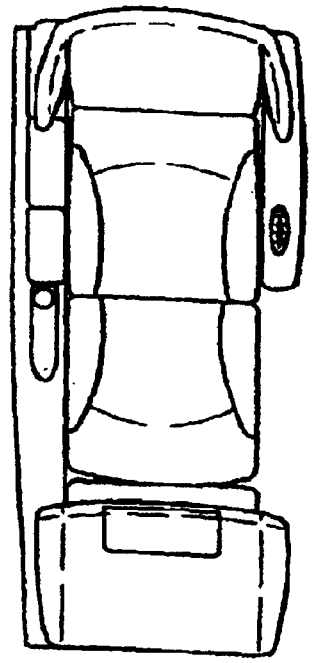
Figure 17E:
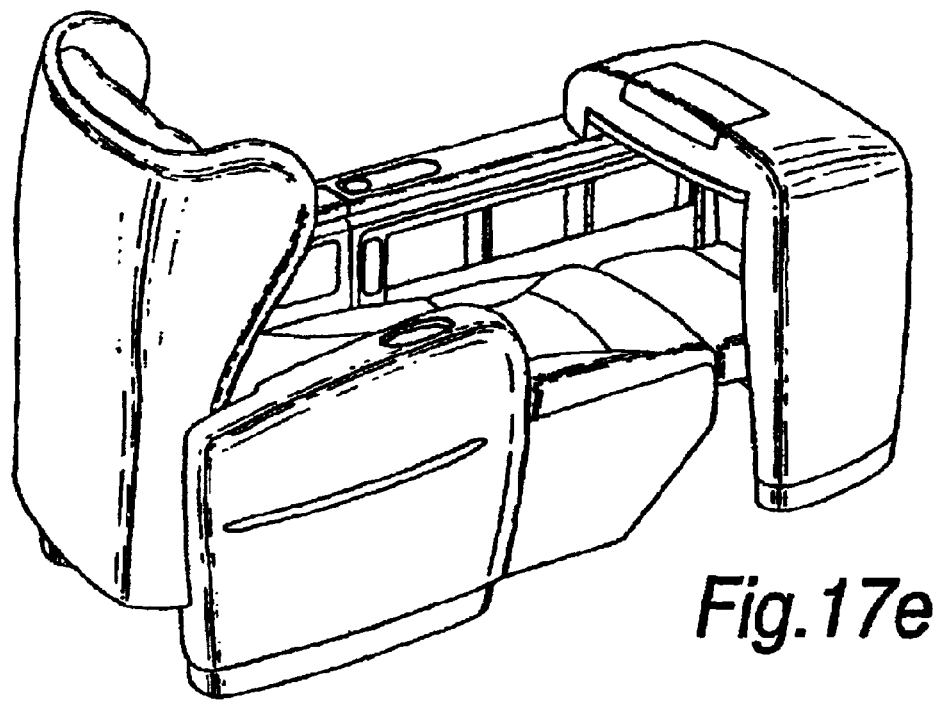
Figure 17F:
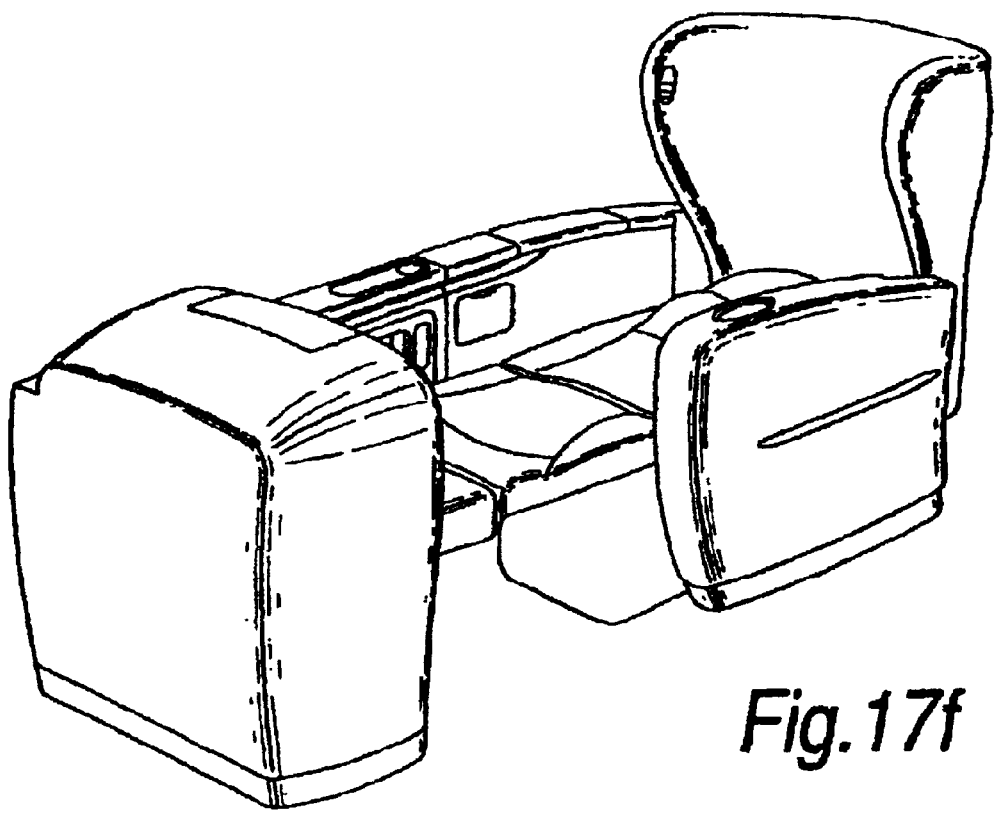
Figure 23A:
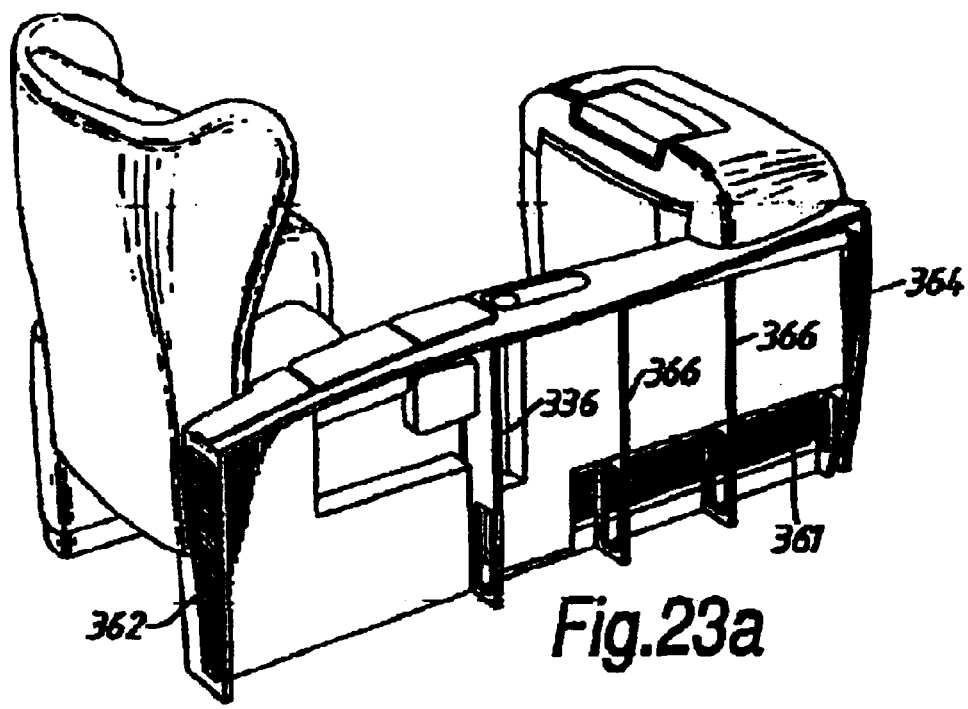
FIG. 23a) and b) illustrate a variant on the seat of FIG. 14.
Figure 23B:
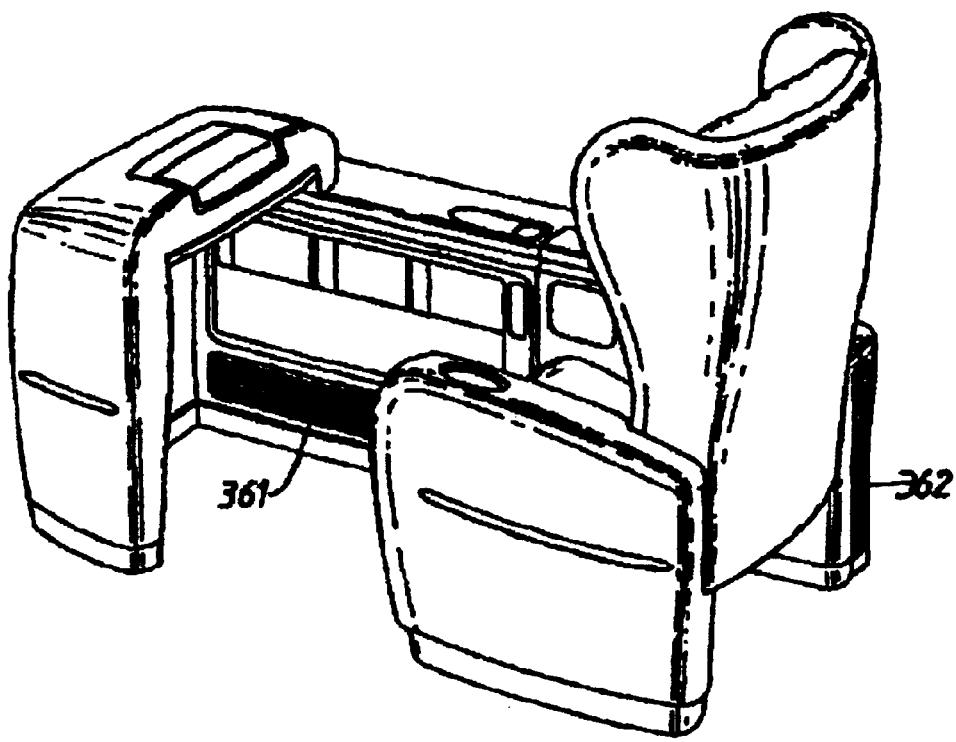

FIG. 23 illustrates the seat of FIG. 14b) in which the side unit 302 is formed with a louvered opening 361 adjacent the front of the seat just above floor level. Similarly, there is a louvered opening 362 at the rear of the side unit 302 and a similar opening 364 at the front of the side unit 302. These provide decompression vents for the enclosed space of the side unit 302. For this purpose, stiffening webs 366 inside the side unit 302 are formed with openings to allow a free flow of air within the side unit space.

Figure 24A:
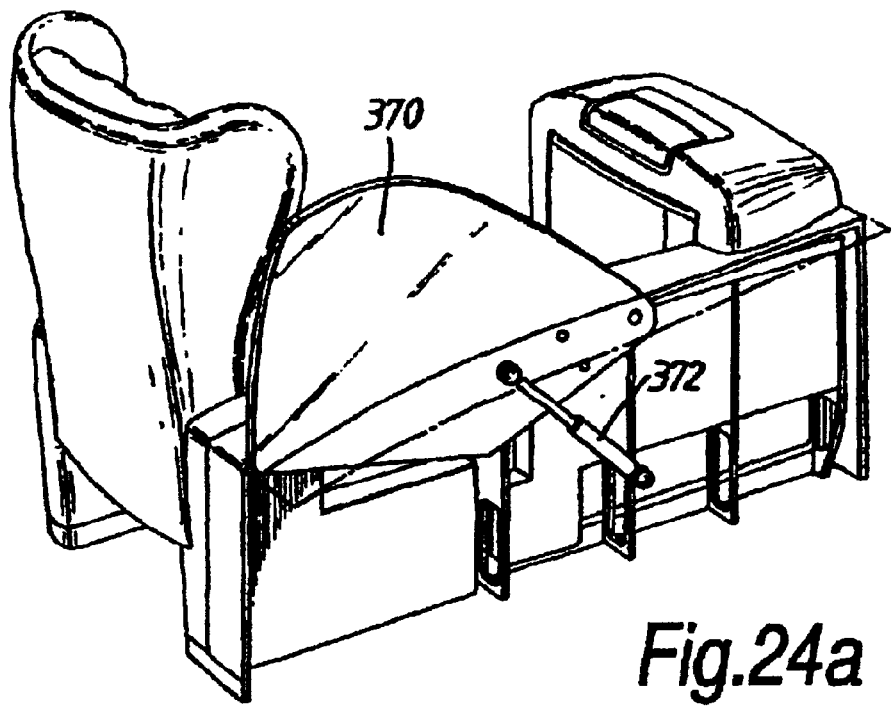
FIG. 24 illustrates modification of the seat of FIG. 14.
Figure 24B:
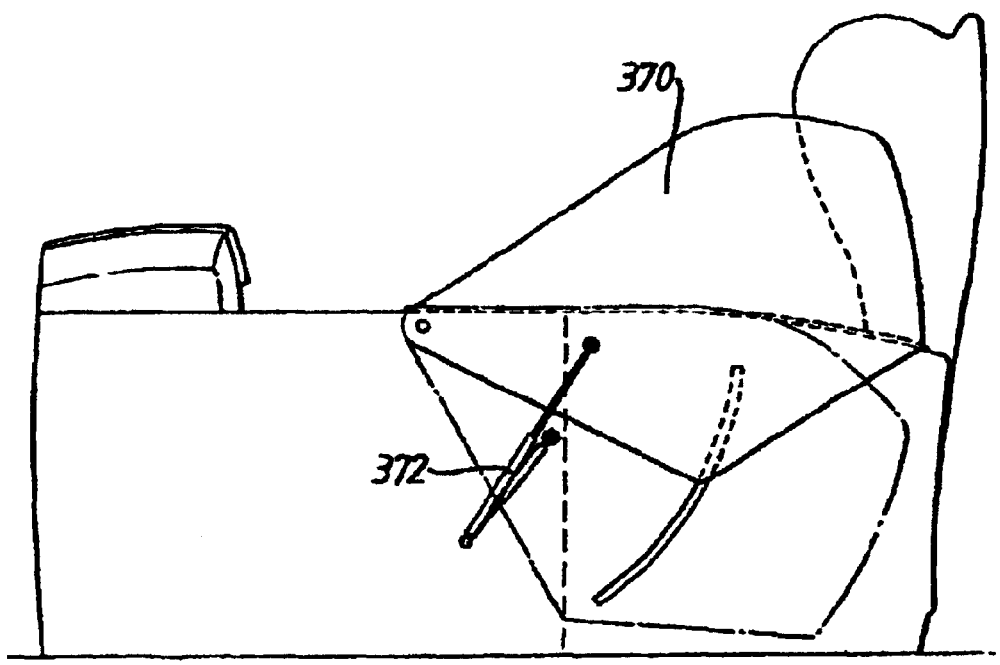

FIG. 24 shows a modification of the previously described seat in a double row arrangement. A privacy screen 370 is hingedly connected with the side unit 302. The screen is actuated to rise out of the side unit 302 through its slot by means of a telescopic gas strut 372. It may alternatively be motor or manually actuated. It will be appreciated that complementary seats in the lines 16 and 14 can be arranged together with a pair of privacy screens for individual use by each occupant, as opposed to the single screen shown in FIG. 24.

Figure 25:
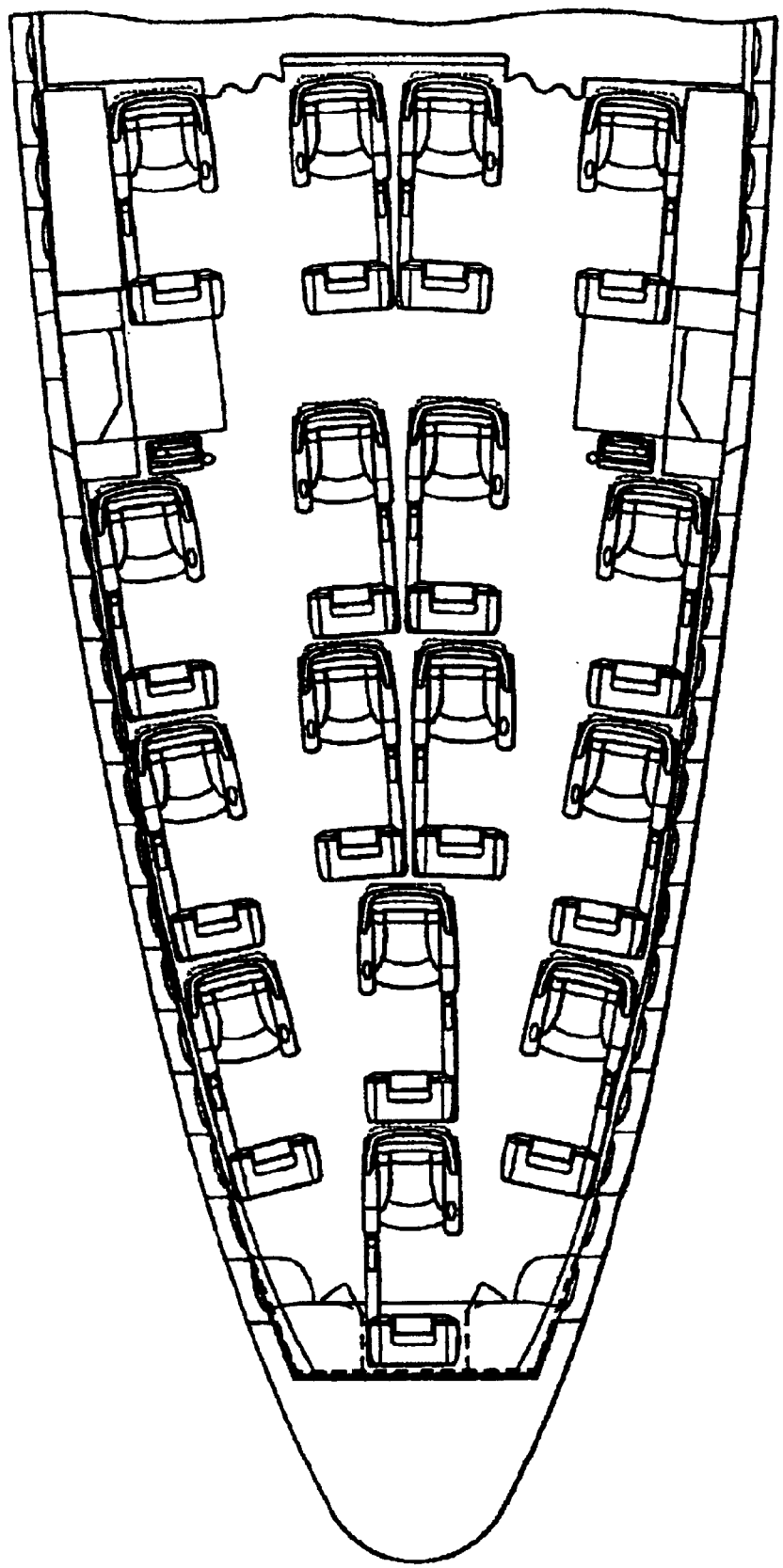
FIGS. 25 to 27 are plans of aircraft cabin spaces stowing seating arrangements.

FIG. 25 illustrates a 16-seat arrangement for an extended first class accommodation area. It will be seen that the arrangement is similar to that in FIG. 11. The seats in adjacent lines are staggered so that each has more privacy with respect to the line on the opposite side of the aisle. However, the outer lines of seats follow the shape of the adjacent fuselage. Also, the double seats in the inner line point toward each other. As the fuselage narrows the converging pairs of seat provide additional aisle space in the narrower nose part of the cabin.

Figure 26:
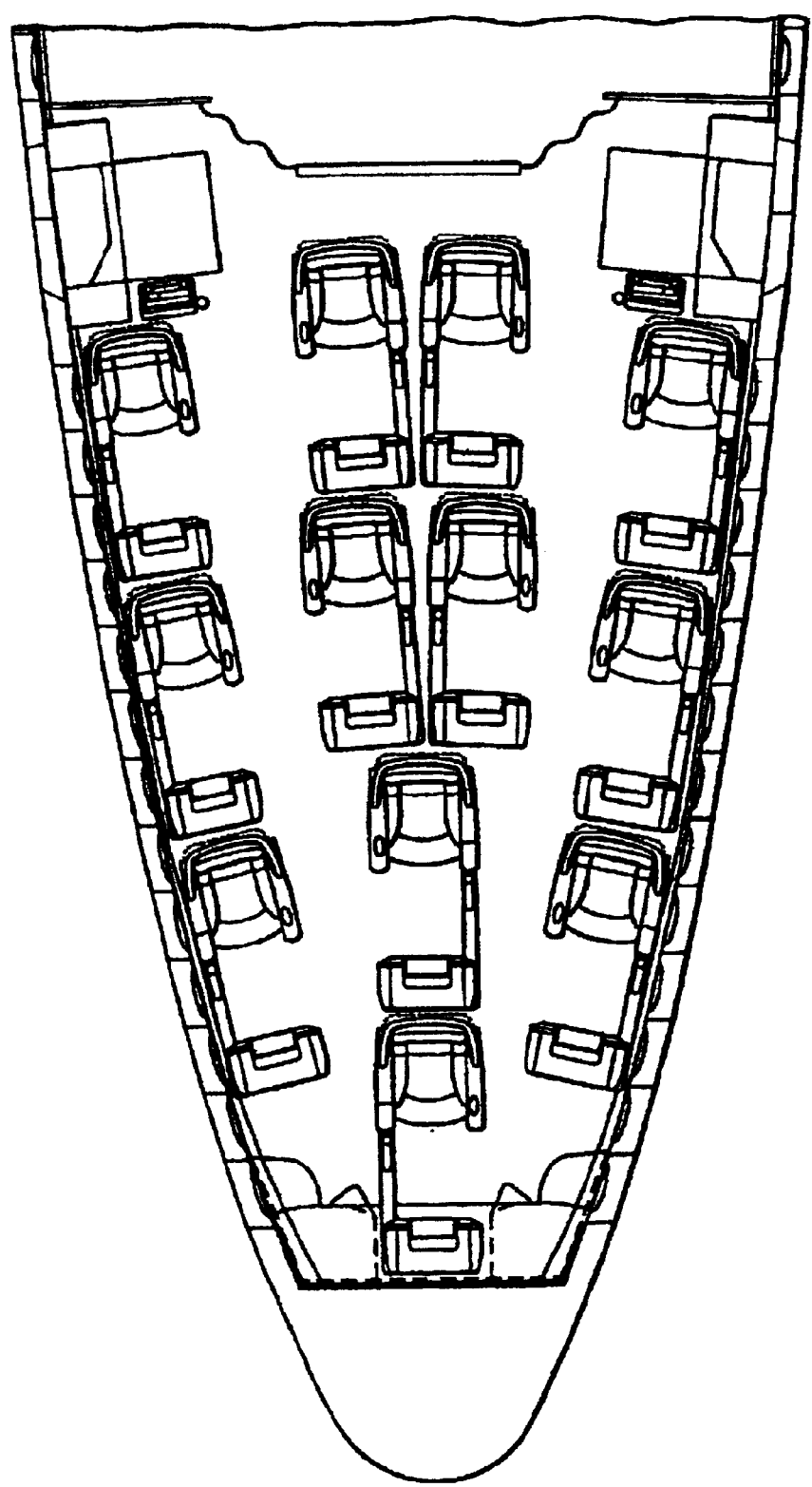

FIG. 26 illustrates a 12 seat arrangement similar to that in FIG. 10 except, again, for the converging pairs of seats in the inner row and the outer lines of seats following the shape of the fuselage.

Figure 27:
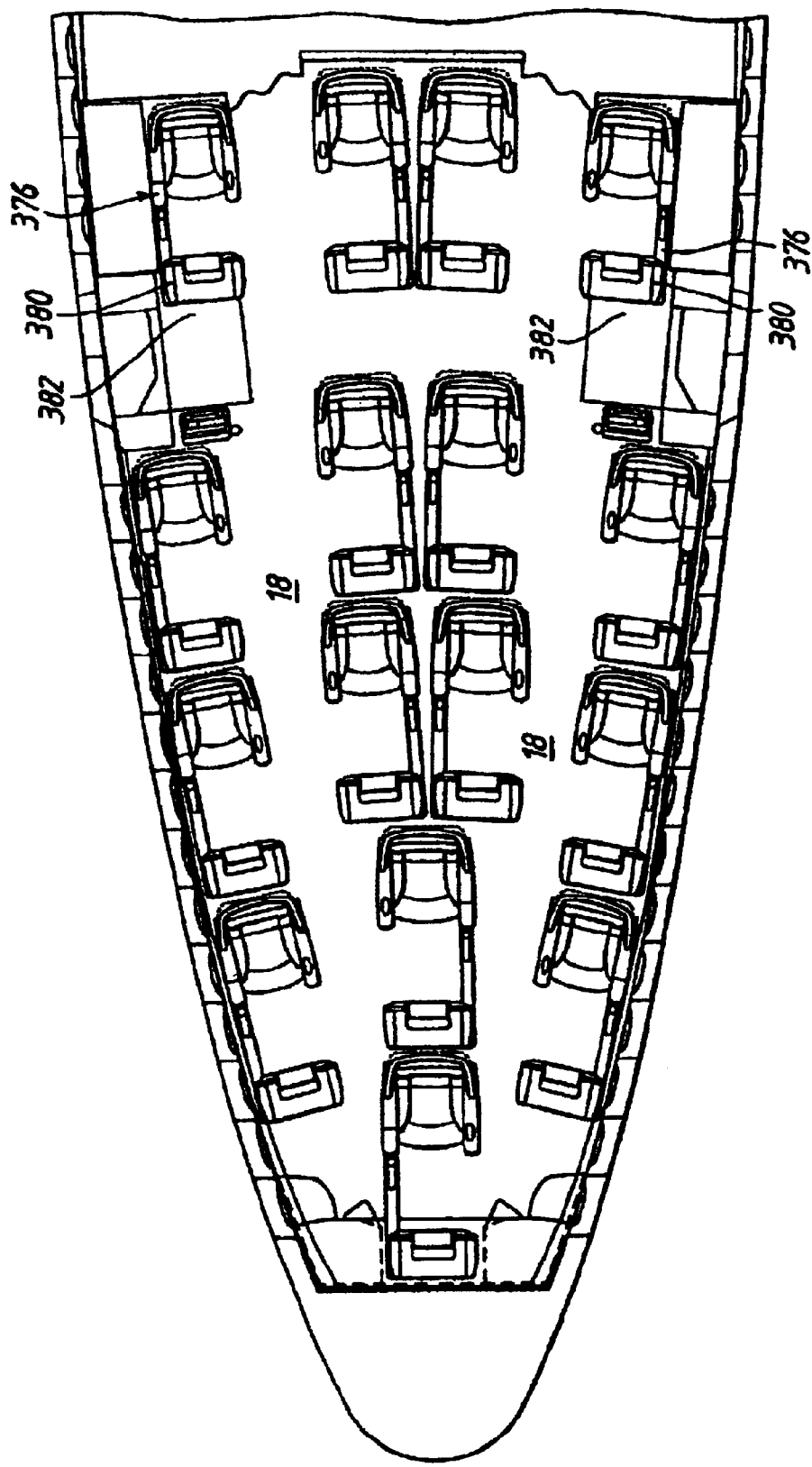

To reduce the extent of the extended first class accommodation in FIG. 25, it is possible to modify the rearmost outboard seat arrangements 376 by bring them forward as shown in FIG. 27. However, this causes the standard length seat unit to intrude upon the space by the front cabin doors that must be kept clear for take-off and landing. Thus, the front console 380 on these rear outer seats is modified to have an extendible front bulkhead 382 which can be moved outwardly into the door space in flight and retracted for take off and landing.

Figure 28:
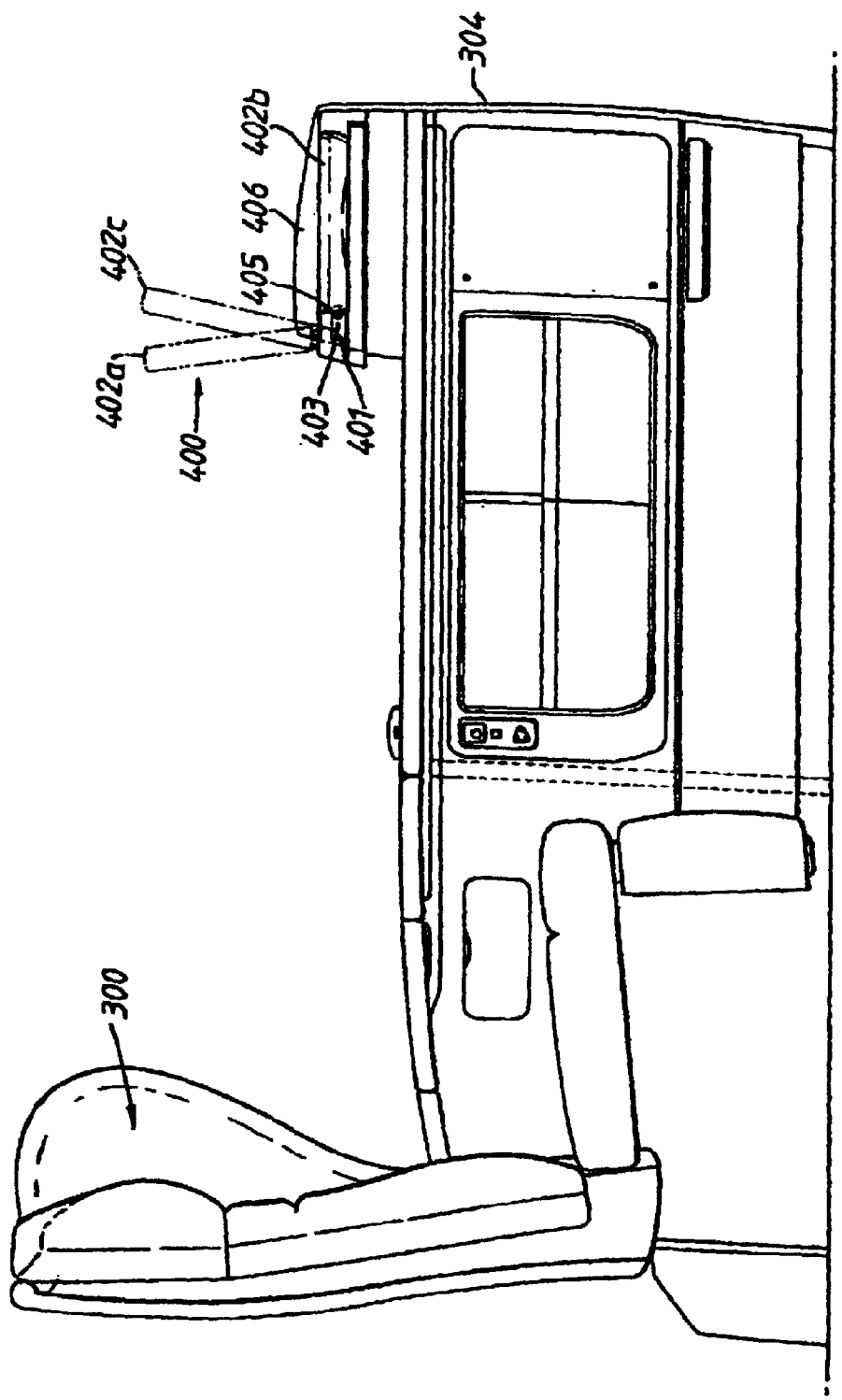
FIG. 28 is a side view showing a display screen mounting arrangement.

Referring now to FIG. 28 an alternative configuration for a display screen such as a television monitor 400 is shown. The display screen 400 is mounted on the forward console 304, at a suitable height for ease of viewing by an occupant of the seat 300. In the embodiment shown, the monitor 400 is placed at the top of the console 304 and the top of the console 304 is accordingly of a suitable height. The monitor 400 is pivotally mounted about a substantially horizontal axis perpendicular to the longitudinal axis of the accommodation unit as a whole and provided at the edge of the console 304 closest to the seat. The monitor 400 is, thus, pivotable between a display position 402a) and a stowed position 402b). The pivot axis is shown generally at 401. The monitor 400 is joined to the axis 401 by a bracket 403 and is further pivoted to the top end of the bracket 403 at a further pivot axis 405. Accordingly, when the monitor 400 is in the display position, it is adjustable about this further pivot axis 405 to a desired viewing position by the user, one such position being shown at 402*c*).

A console cover 406 is further provided. The cover 406 is positioned to close the area in which the console is stowed in its stowed position 402*b*). As a result, the cover 406 provides protection for the monitor 400 when it is stowed away. The cover 406 is also closeable when the monitor 400 is in the display position 402*a*) to prevent other objects being placed in the storage space which could interfere with subsequent operation. In either configuration, the cover 406 preserve the aesthetic line of the accommodation unit as a whole. The cover 406 is pivotably mounted about an axis parallel to pivot axis 401 but at the opposed side of the top of the console 304. Accordingly, the cover 406 simply pivots up and out of the way to allow the monitor 400 to be moved between stowed and display positions, and pivots back down to cover the top of the console 304.

Movement of the monitor 400 between its stowed and displayed positions, and incorporating movement of the cover 406 may be achieved either manually or by an automatic drive mechanism as appropriate. It will be appreciated that other mounting arrangements other than pivoting arrangements, for example retracting or sliding arrangements, could be used for either or both the monitor 400 and cover 406. Alternatively, the pivot mountings for the monitor 400 and cover 406 could be reversed as appropriate.

Figure 31:
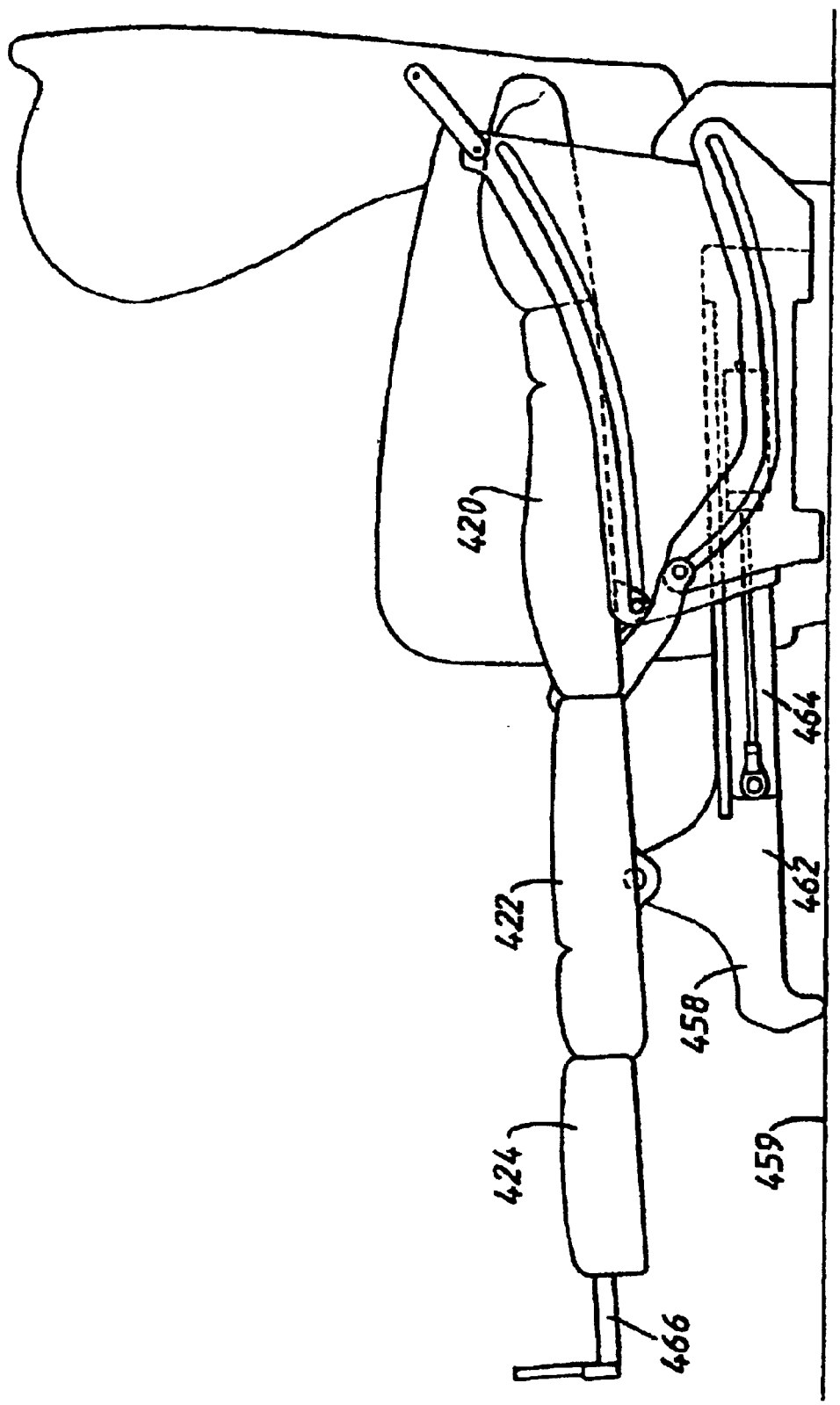
FIG. 31 shows, schematically, the seat of FIGS. 29a) to 29d) in a reclined position.

Referring now to FIGS. 29 to 31, an alternative seat articulation mechanism is shown allowing movement of the chair between a seat position and a bed position.

Figure 29A:
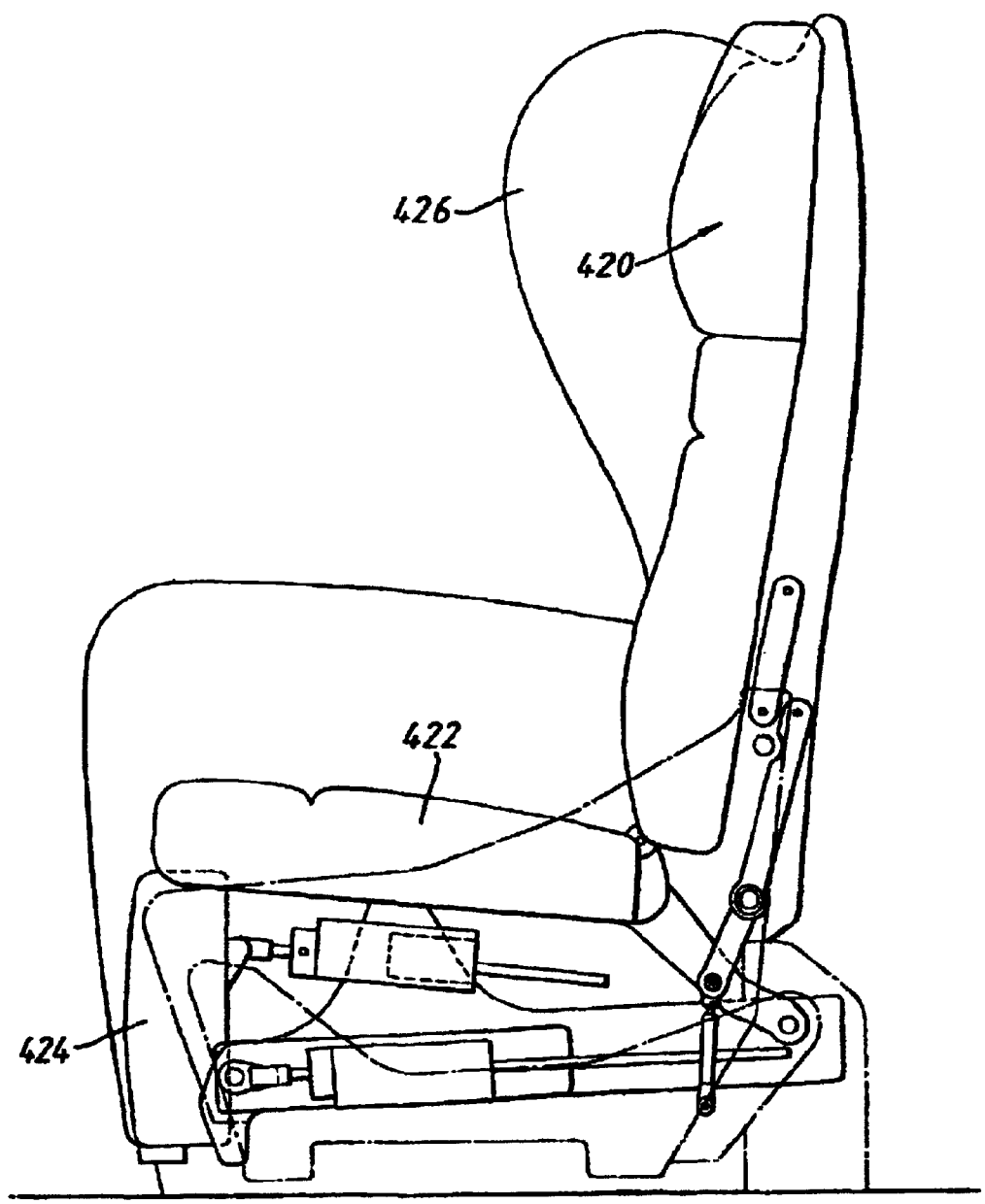
FIGS. 29a) to 29d) show, schematically, aspects of an articulation mechanism for a seat in a "S" seating position.

FIGS. 29*a*) to *d*) illustrate the various principle components in the arrangement, shown in bold, as appropriate for clarity. The seat includes a seat back 420, a seat portion 422 and a leg rest 424. The seat further includes a movable back shell 426.

Figure 29B:
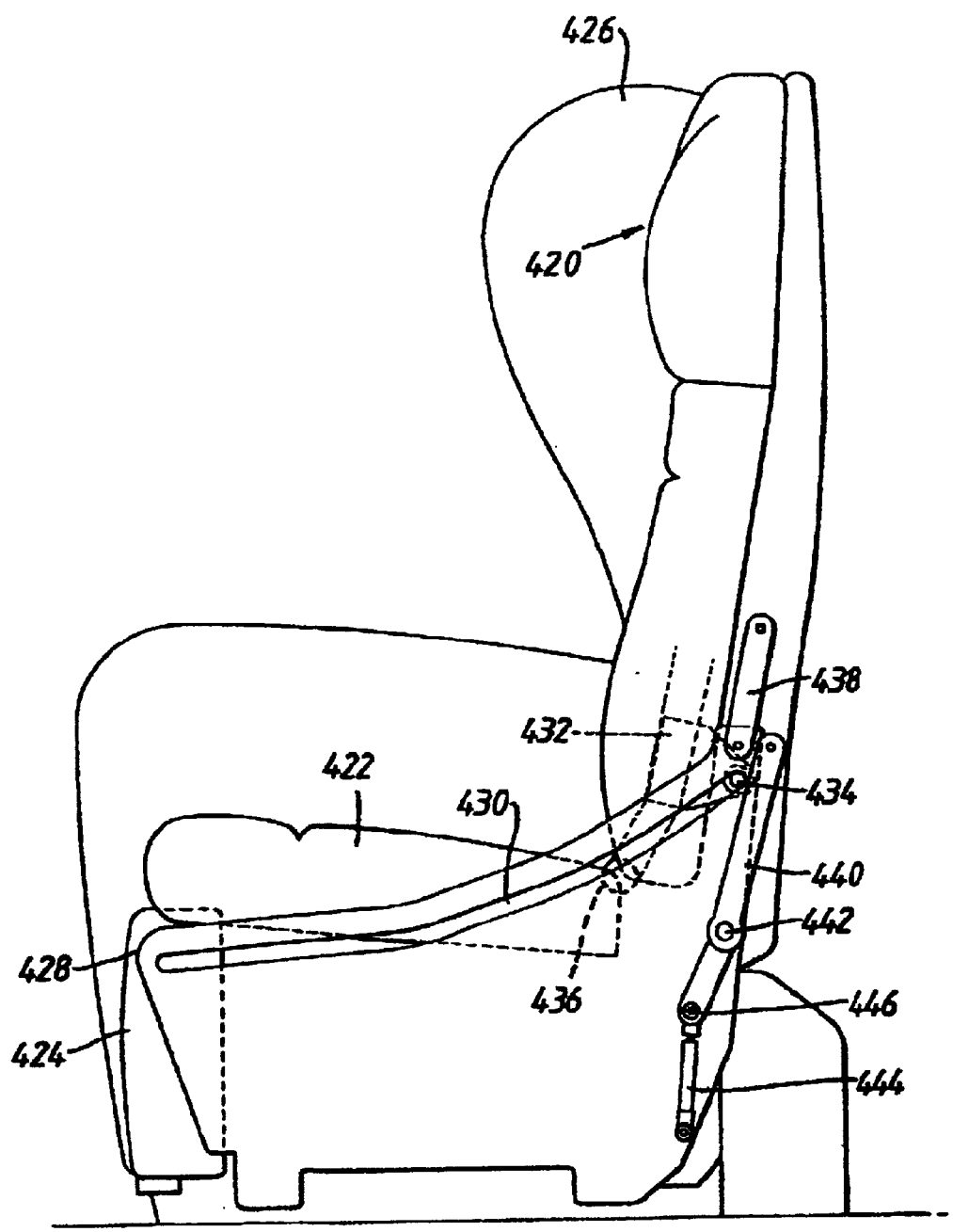

Referring to FIG. 29*b*) the seat includes a first fixed guide 428 having a guide slot 430. The seat back 420 includes a bracket 432 and guide bearing 434 received in the guide slot 430. Accordingly, forward motion of the seat back 420 is guided by movement of the guide bearing 434 along the guide slot 430 together with a hinged attachment 436 to the seat portion 422.

Also connected to the upper end of the first fixed guide 428 is an arm 438 which is pivotably mounted on the first fixed guide 428 at its lower end and pivotably mounted to the fixed shell 426 at its upper end. The fixed shell 426 is also pivotably mounted to a cranked arm 440 at its upper end. The elbow of the cranked arm 440 is pivotably mounted to the first fixed guide 428 at a pivot point 442 and is pivotably mounted to and raisable by the push rod of a fluid or other suitable linear actuator 444 at its lower end 446. The back shell 426 is driveable downwardly and rearwardly by upward motion of the actuator 444 as guided by the arms 438 and 440.

Figure 29C:
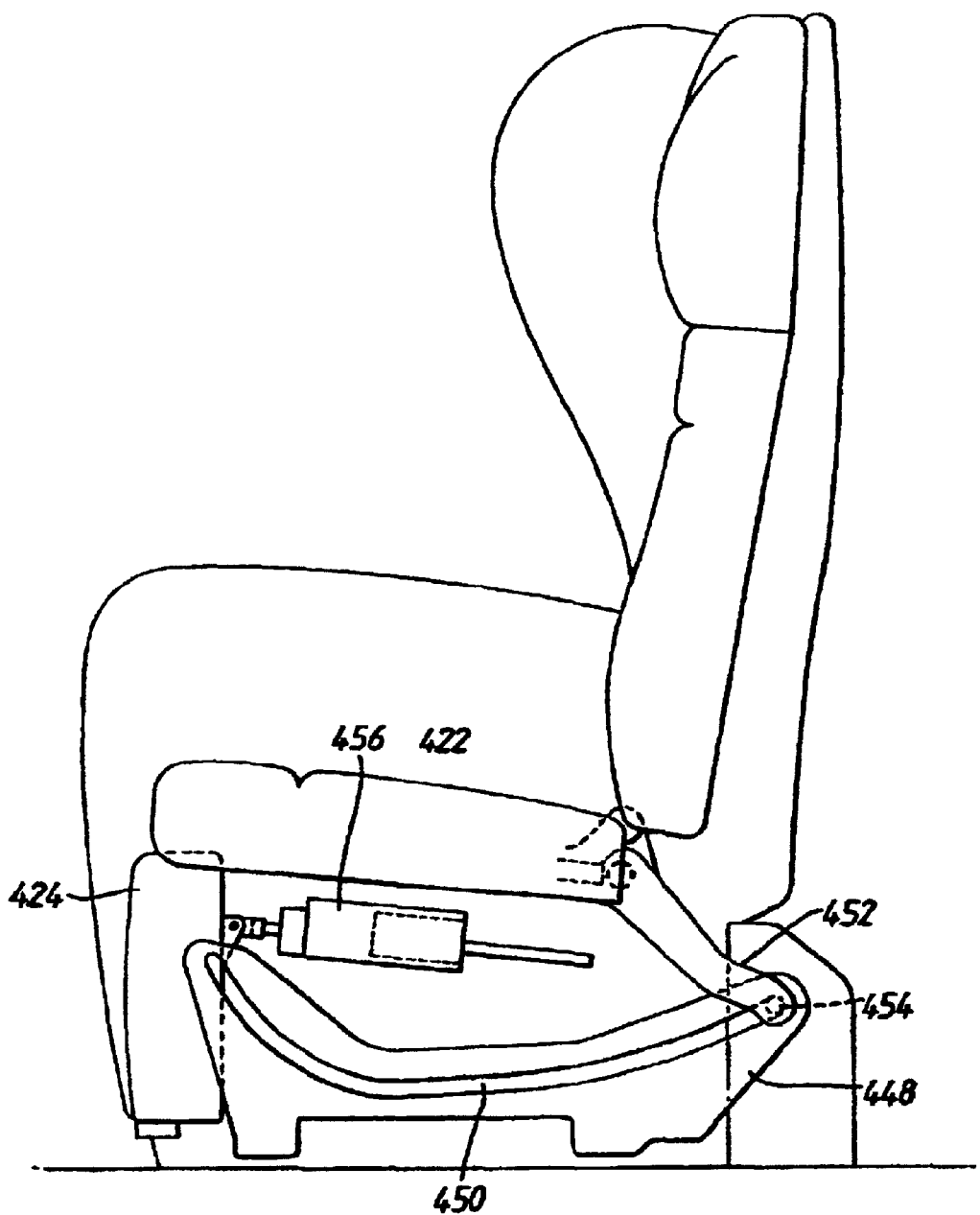

Referring to FIG. 29*c*) a second fixed guide 448 includes a second guide slot 450. A bracket 452 is fixedly mounted to the seat portion 422 at its upper end and includes a second guide bearing 454 in the second guide slot 450. Also shown in FIG. 29*c*) is a linear actuator 456 for raising the leg rest 424 relative to the seat portion 422.

Figure 29D:
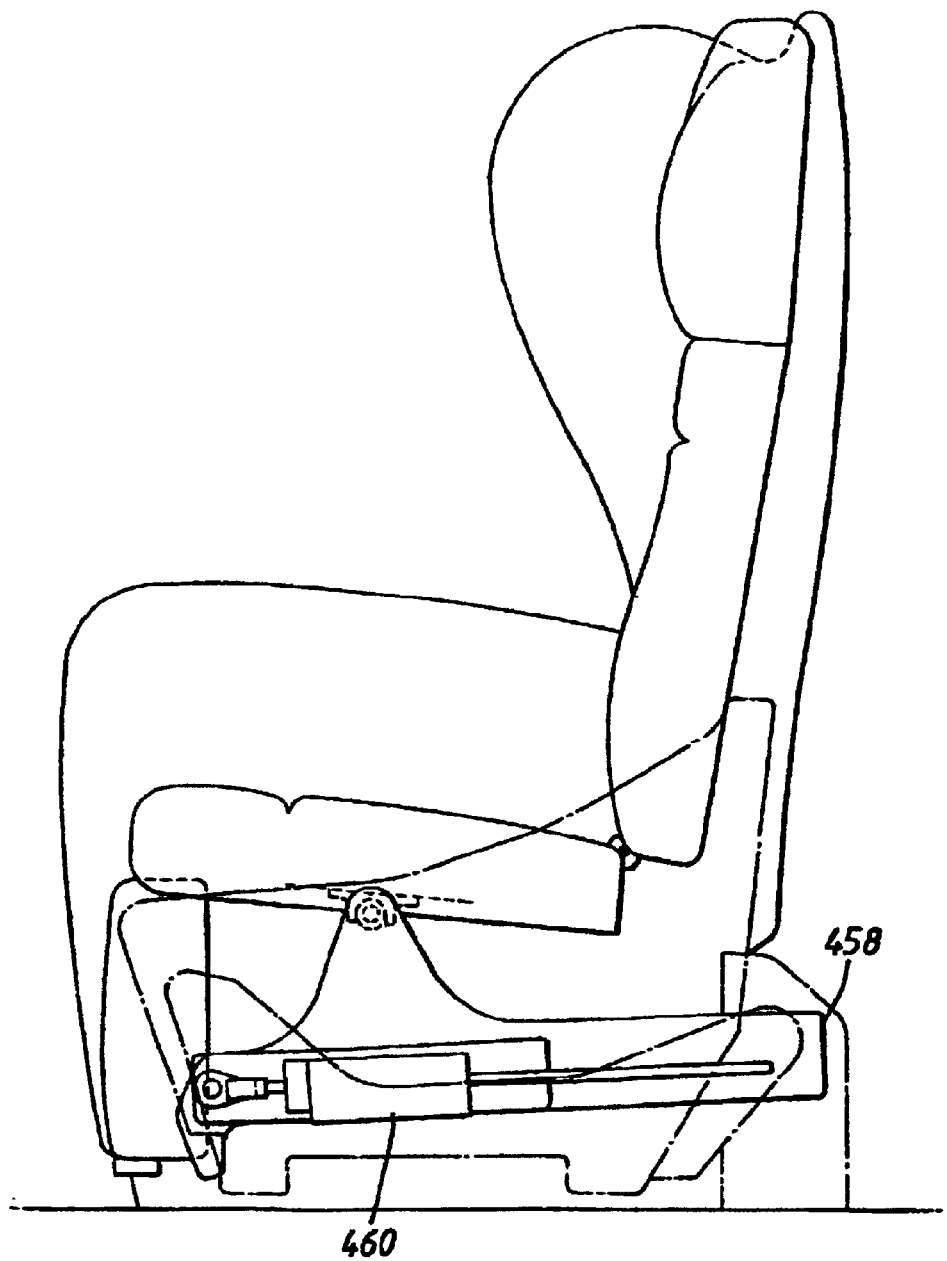

The seat portion 422 is additionally guided by a support arm 458 shown in FIG. 29*d*). The support arm 458 is driveable linearly forwardly by a linear actuator 460 and, as can thus be seen in FIGS. 30 and 31 is formed of two stages 462 and 464 which extend linearly telescopically.

Operation of the arrangement shown in FIGS. 29 to 31 will now be described. In the seating position shown in FIG. 29, the seat back 420 is fully upright and the leg rest 424 is fully retracted. The first and second guide bearings 434, 450 are at their rear most positions in their respective guide slots 430, 454, support arm 458 is fully retracted and back shell 426 is in its forwardmost and uppermost position.

In FIG. 30, the seat is shown in a reclined position. The back shell 426 is driven to its rearmost, lowermost position by actuator 444 cooperating with guide arms 438 and 440. The support arm 458 has been moved forwardly to an intermediate telescoped position by the linear actuator 460 drawing the seat portion forwardly and adjusting its orientation as determined by the cooperation of second guide slot 450 and second guide bearing 454. The seat back 420 is also drawn forward by the seat portion 422 at hinge 436 as guided by the cooperation of the first guide slot 430 with the first guide bearing 434. The leg rest 424 is raised by linear actuator 456 (not shown); in addition, a foot rest 466 is slidably mounted in the leg rest 424 is driven to an extended position by a suitable actuator (not shown).

FIG. 31 shows the seat back 420, seat portion 422 and leg rest portion 424 in their final positions with support arm 458 in its fully extended position. It will be seen that the support arm 458 is spaced very slightly from the supporting surface 459 to provide support should excessive weight be applied to the distal end of the seating arrangement.

The steps set out above are reversed to return the seats to its seating position.

While various embodiments have been described, it is to be noted that a feature referred to in relation to one embodiment could equally well be used in relation to the others. For example, the movable and retractable arms of FIGS. 2, 3, 4 and 5 can be used in the seats of FIGS. 12 onwards. Similarly, the table seat control panel and over ancillary equipment of the seats of FIGS. 12 onwards can be used in relation to the seat of FIGS. 2, 3, 4 and 5. Thus, while various embodiments of the invention have been described by way of example, it will be apparent to the skilled person that various modifications and alterations can be made without departing from the invention. The invention is intended to be limited only by the spirit and scope of the accompanying claims.

What is claimed is:

1. A display screen console for a vehicle accommodation unit comprising a display screen, a display screen stowage space and a stowage space cover, the display screen and the stowage space cover being pivotally mounted at opposite sides of the stowage space, wherein the stowage space cover is movable between a fully closed position in which the stowage space is covered and an open position to allow the display screen to be moved between a display position and a stowed position, wherein the stowage space cover is movable to the fully closed position to cover the stowage space when the display screen is in either position.

2. A display screen console as claimed in claim 1 in which the display screen comprises a TV-type monitor.

3. A display screen console for a vehicle accommodation unit comprising:
   a console defining a stowage space;
   a display screen pivotally mounted to the console proximate a first end of the stowage space, such that the display screen is movable between a display position and a stowed position;
   a stowage space cover pivotally mounted to the console proximate a second end of the stowage space, the stowage space cover movable between a fully closed position and open position when the display screen is in either the display or stowed position.

4. The display screen console of claim 3, further comprising a bracket having first and second ends, the first end pivotally mounted proximate the first end of the stowage space to define a first pivot axis, the second end pivotally mounted to the display screen to define a second pivot axis, such that the display screen is adjustable about the second pivot axis to a desired viewing position by a user.

5. The display screen console of claim 4, wherein the first and second pivot axes are substantially horizontal.

6. The display screen console of claim 5, wherein the console defines a longitudinal axis, and wherein the first and second pivot axes are generally perpendicular to the longitudinal axis of the console.

* * * * *